(12) United States Patent
Willis

(10) Patent No.: US 7,805,690 B2
(45) Date of Patent: Sep. 28, 2010

(54) METHOD FOR GENERATING COMPILER, SIMULATION, SYNTHESIS AND TEST SUITE FROM A COMMON PROCESSOR SPECIFICATION

(75) Inventor: John Willis, Rochester, MN (US)

(73) Assignee: FTL Systems, Inc., Rochester, MN (US)

( * ) Notice: Subject to any disclaimer, the term of this patent is extended or adjusted under 35 U.S.C. 154(b) by 358 days.

(21) Appl. No.: 11/865,596

(22) Filed: Oct. 1, 2007

(65) Prior Publication Data
US 2008/0250360 A1    Oct. 9, 2008

Related U.S. Application Data

(62) Division of application No. 11/159,762, filed on Jun. 23, 2005, now Pat. No. 7,278,122.

(51) Int. Cl.
G06F 17/50    (2006.01)

(52) U.S. Cl. ............................................. 716/3; 716/18

(58) Field of Classification Search ...................... 716/3, 716/18
See application file for complete search history.

(56) References Cited

U.S. PATENT DOCUMENTS

| | | | |
|---|---|---|---|
| 5,224,055 | A | 6/1993 | Grundy et al. |
| 5,748,979 | A | 5/1998 | Trimberger |
| 5,896,521 | A | 4/1999 | Shackleford |
| 6,075,935 | A | 6/2000 | Ussery et al. |
| 6,077,315 | A | 6/2000 | Greenbaum et al. |
| 6,078,736 | A | 6/2000 | Guccione |
| 6,230,114 | B1 * | 5/2001 | Hellestrand et al. ........... 703/13 |
| 6,263,302 | B1 * | 7/2001 | Hellestrand et al. ........... 703/17 |
| 6,298,472 | B1 | 10/2001 | Phillips et al. |

(Continued)

FOREIGN PATENT DOCUMENTS

WO    WO 97/13209    4/1997

(Continued)

OTHER PUBLICATIONS

Iseli, Christian et al., "A C++ compiler for FPGA custom execution units synthesis," FPGAs for Custom Computing Machines, 1995, pp. 173-179, pub. Apr. 1995.

(Continued)

*Primary Examiner*—Phallaka Kik
(74) *Attorney, Agent, or Firm*—Craig J. Lervick; Ojanen Law Offices; Karuna Ojanen

(57) ABSTRACT

A hardware/software design tool converts an electronic design specification and zero or more technology specifications into realization of the electronic design in computer hardware, software and firmware. It compiles design and logic technology specifications into a model which can be utilized for behavioral analysis of logical characteristics. It translates partitions of the design and one or more logic technologies into one or more processor intermediates or binaries suitable for execution on multi-purpose processing units. It translates partitions of the design and logic technology into a collection of cells and interconnects suitable for input to physical design processes such as is required to target a FPGA, ASIC, system-on-a-chip or custom logic. It analyzes behavior of the embedded binaries running on processing units and implementations augmented by additional physical technology and parameters, yielding a more detailed prediction of the resulting hardware/software system behavior when realized through manufacturing.

3 Claims, 14 Drawing Sheets

U.S. PATENT DOCUMENTS

| | | | |
|---|---|---|---|
| 6,477,683 B1 * | 11/2002 | Killian et al. | 716/1 |
| 6,484,304 B1 | 11/2002 | Ussery et al. | |
| 6,557,156 B1 | 4/2003 | Guccione | |
| 6,701,515 B1 * | 3/2004 | Wilson et al. | 717/117 |
| 6,725,361 B1 * | 4/2004 | Rozas et al. | 712/222 |
| 6,751,583 B1 * | 6/2004 | Clarke et al. | 703/17 |
| 6,760,888 B2 | 7/2004 | Killian et al. | |
| 6,980,946 B2 * | 12/2005 | Giles et al. | 703/22 |
| 7,020,854 B2 * | 3/2006 | Killian et al. | 716/1 |
| 7,093,156 B1 | 8/2006 | Shubat et al. | |
| 7,168,060 B2 | 1/2007 | Matsumoto et al. | |
| 2002/0019969 A1 * | 2/2002 | Hellestrand et al. | 716/5 |
| 2002/0133810 A1 * | 9/2002 | Giles et al. | 717/138 |
| 2003/0208723 A1 * | 11/2003 | Killian et al. | 716/1 |
| 2004/0221273 A1 * | 11/2004 | Sandham et al. | 717/134 |
| 2004/0250231 A1 * | 12/2004 | Killian et al. | 716/18 |
| 2008/0244471 A1 * | 10/2008 | Killian et al. | 716/1 |
| 2008/0244506 A1 * | 10/2008 | Killian et al. | 717/100 |

FOREIGN PATENT DOCUMENTS

| | | |
|---|---|---|
| WO | WO 00/46704 | 8/2000 |
| WO | WO 2004/025904 | 3/2004 |

OTHER PUBLICATIONS

Lee, Jong-eun et al., "Efficient Instruction Encoding for Automatic Instruction Set Design of Configurable ASIPs," Computer Aided Design (2002), pp. 649-654, pub. Nov. 2002.

Stitt, G., et al., "Dynamic Hardware/Software Partitioning: A First Approach," Design Automation Conference 2003, pp. 250-255, pub. Jun. 2003.

Meribout, Mahmoud, et al., "A Combined Approach to High-Level Synthesis for Dynamically Reconfigurable Systems," Computers, IEEE Transactions on, vol. 53, Issue 12, pp. 1508-1522, pub. Dec. 2004.

Wakabayashi, K., "CyberWorkBench: Integrated Design Environment Based on C-based Behavior Synthesis and Verification," VLSI Design, Automation and Test, 2005, pp. 173-176, pub. Apr. 2005.

Wakabayashi, K., "System LSI Design with C-based Behaviorial Synthesis and Verification," Circuits and Systems, 2005, pp. 5930-5933, pub. May 2005.

Vestias, M.P., "Co-Synthesis of a Configurable SoC Platform based on a Network on Chip Architecture," Design Automation 2006, pp. 48-53, pub. Jan. 2006.

Leupers, R., et al., "A Design Flow for Configurable Embedded Processors based on Optimized Instruction Set Extension Synthesis," Design, Automation and Test in Europe, 2006, 6 pages, pub. Mar. 2006.

Goossens, G., et al., "Design of ASIPs in multi-processor SoCs using the Chess/Checkers retargetable tool suite," System-on-Chip, 2006, 4 pages, pub. Nov. 2006.

Chouliaras, V.A., et al., "SystemC-defined SIMD instructions for high performance SoC architectures," Electronics, Circuits and Systems, 2006, pp. 822-825, pub. Dec. 2006.

Jozwiak, L., et al., "Multi-objective Optimal Controller Synthesis for Heterogeneous Embedded Systems," Embedded Computer Systems: Architectures, Modeling and Simulation, 2006, pp. 177-184, pub. Jul. 2007.

Gay, Wanda, et al., "A Configurable Processor Synthesis System," Field-Programmable Custom Computing Machines, 2007, pp. 331-332, pub. Apr. 2007.

Supplemental Search Report of Jan. 23, 2009 for Applic. No. PCT/US05/22570.

Hadjiyiannis G. et al., "ISDL: An Instruction Set Description Language for Retargetability," Proceedings of the Design Automation Conference. Anaheim, Jun. 9-13, 1997; [Proceedings of the Design Automation Conference], New York, ACM, US, vol. Conf. 34, Jun. 9, 1997; p. 299-302.

Campi et al.: "A reconfigurable processor architecture and software development environment for embedded systems," Parallel and Distributed Processing Symposium, 2003. Proceedings. International, Apr. 22-26, 2003, Piscataway, NJ, USA, IEEE, Apr. 22, 2003, pp. 171-178.

* cited by examiner

FIG. 5

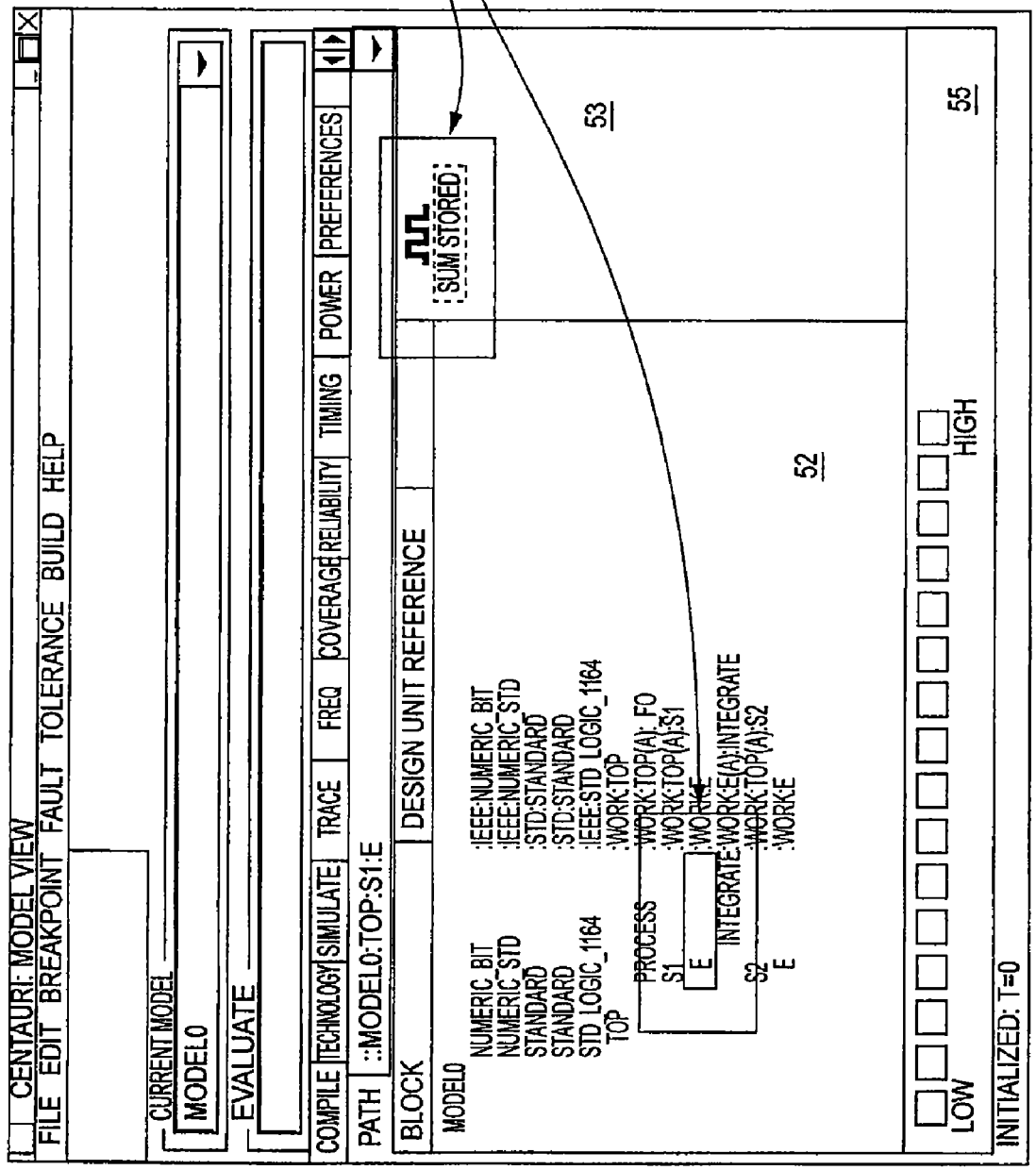

```
LIBRARY IEEE;
USE IEEE.STD_LOGIC_1164.ALL;
USE IEEE.NUMERIC_BIT.ALL;
ENTITY TOP
IS
    SIGNAL CLOCK : STD_ULOGIC;
END ENTITY TOP;

ARCHITECTURE A OF TOP IS
BEGIN
    S1:WORK.E(A) PORT MAP("10000000",TRUE,CLOCK);
    S2:WORK.E(A) PORT MAP("01000000",FALSE,CLOCK);
    PROCESS
    BEGIN
        CLOCK <=NOT CLOCK;
        WAIT FOR 10 NS;
    END PROCESS;
END ARCHITECTURE A;
```

54

G:\AURIGA\DEMO\FTI\FTI.VHD:  29:  14: VHDLAMS99

ANALYZE G:\AURIGA\DEMO\FTI\FTI.VHD::WORK VHDLAMS99

METHOD FOR GENERATING COMPILER, SIMULATION, SYNTHESIS AND TEST SUITE FROM A COMMON PROCESSOR SPECIFICATION

CROSS REFERENCE TO RELATED APPLICATION

The present application is a divisional of U.S. patent application Ser. No. 11/159,762 filed Jun. 23, 2005, the content of which is hereby incorporated by reference in its entirety, which claims the benefit of U.S. provisional application No. 60/582,590, filed Jun. 24, 2004.

FIELD OF INVENTION

The present invention relates to the field of hardware, software and integrated hardware/software languages and tools that support the translation from design intent to realized hardware, software or integrated hardware/software products.

BACKGROUND OF THE INVENTION

Prior art for tools used in the design of hardware, software or combined hardware/software systems embed specific logic and physical technology directly in the tool or in designs using the tool. This increases the human effort required to translate a design into a optimized realization in hardware and/or software. The present invention teaches related mechanisms for augmenting hardware description languages or programming languages so that logic and physical technology may be added without intrinsic changes to the base tool. The added technologies may be used to manually or automatically create more optimal realization in hardware and/or software.

Subsequent discussion will distinguish specifics by which the present invention improves on prior art.

BRIEF SUMMARY OF THE INVENTION

The invention disclosed herein provides for the use of technology specifications defined external to the hardware/software tool (hereafter tool) in the translation of a design into a pre-synthesis behavioral analysis, compilation of a design partition into executables for embedded processors, synthesis into net-lists (comprising cell instances and connecting nets), and post compilation analysis/optimization using simulation and formal methods.

This invention consists of two inter-related parts. First, several innovative augmentations to conventional hardware description languages or programming languages distinctly specify design intent, logic technology and physical technology (hereafter simple referred to as technology). These language augmentations serve to externally extend a tool to innovatively utilize and optimize using technologies which are not embedded within the design tool. Second, an innovative tool provides for incorporation of externally defined logic and physical technology specifications during four inter-related modes of operation: (1) behavioral analysis, (2) processor compilation (3) logic synthesis and (4) verification post-synthesis. This process yields a potentially optimized realization of the design intent using a combination of processor executables (configuration of one or more memory cells), re-configurable logic arrays (configuration embodied in dynamic or static configuration memory cell values), manufactured metalization layers within an Application Specific Integrated Circuit (ASIC) or unconstrained configuration of a custom integrated circuit via well-known semiconductor fabrication processes.

Language Augmentation

Conventional hardware description languages (HDL) or programming languages may be augmented in several innovative ways. These innovations improve on prior art by (1) more compactly and thus efficiently representing design intent (2) more explicitly separating design intent from specific logic and physical technologies which may be used to implement the design intent. Greater separation of design intent from the specification of logical or physical technology used to implement the intent improves on prior art by (1) requiring less textual description to represent design intent (less to be written and maintained), (2) by avoiding over-constraining specifications of the design intent (such as by embedding specifics of particular logic or physical technology) and (3) by enabling a hardware/software design tool to (3a) analyze and either manually or automatically (3b) select and (3c) implement particular logic or physical technology so as to more optimally express the design intent.

Relationship Between a Design and Implementation Technologies

To better enable the tool to select and configure specific logic and physical technologies to a design, the design intent must express (1) the desired algorithmic state (2) algorithmic operations on the state (3) optimization objectives expressed in terms of state and transformations. For example a data compression design make be described in terms of the state required to represent the incoming data stream, the mapping between prior segments of the input stream and the token designed to designate the segment, the output data stream, operations such as compress and decompress and optimization and optimization objectives such as the required time latency bounds between input and output streams, the number of tokens which must be processed per unit time or the allowed probability of decompression error.

A design intent's state, operations and objectives need not be discrete. For example the state may include quantities which are continuous in value, time and even frequency. Operations on such state may be described as relationships, such as the voltage across a (resistive) element must always be the current through the element multiplied by the resistance.

Logic and physical technologies describe known techniques for expressing the intent, generally in progressively more concrete terms. For example, a logical technology may describe a means for embodying state using a traditional clocked logic technology, as an asynchronous micro-pipeline technology or using various kinds of spatial or temporal redundancy. Examples of physical technology include a specific set of cell designs and routing options which may be provided by a specific FPGA or ASIC technology.

The distinction between logic and physical technologies is primarily for clarity of presentation and is not intrinsic to what is taught herein; henceforth we will refer to simply to technologies when referring to characteristics applicable to either logical or physical technologies. Technologies may be used constructively. For example, a (logic) technology embodying parity encoding may in turn be implemented using an asynchronous micro-pipeline (logic) technology which in turn utilizes a specific (physical) ASIC library. These constructive technology layers generally provide a multitude of alternatives for the expression of design intent. A design may be realized through some combinations of manual and automatic selection of technologies to optimally express design objectives.

Technology Representation Using Type Systems

The present invention uses type systems, well-known in the computer science and mathematical literature, to correctly organize technologies and their complex inter-relationships. Type systems consist of a domain of values representing state and operators representing operations on the state. For example, a type might represent the domain of integer (discrete) values from 0 to 7. Operators may then be defined to initialize, add, subtract and multiply values of the type. Conversion operators may convert from other types into this type or from this type into other types.

In type systems, subtypes specialize a type. For example, a subtype of the integer type used in the example above may be restricted to the domain from 0 to 3 but may acquire additional operators (such as division) and redefine operators (such as redefining the addition of 3 and 1 to denote an error condition for values of the subtype).

Both design intent and definitions of a type system (representing a technology) may be enclosed within blocks containing parameters. These parameters may be of fixed value (generic values), locally static value (definite at the time the blocks are expanded), dynamic value (definite only during evaluation, changing over time), fixed type (generic types), locally static types or dynamic types. For example, a block defining a fault tolerant adder implementation may be defined in terms of a parametric type. This enables the fault tolerant adder implementation to be applied to the addition of many different argument types and subtypes. For example, such an adder block with locally static types might utilize the C++ template construct or Ada's type generics.

Conversely, types and subtypes may be declared or defined within a block containing parameters. For example, parameter values may define the limits of an integer (discrete) domain. Parametric types, for example, may define the element type or index domain of an array. Use of parametric values and types in the definition of a type which represents a technology facilitates development of constructive systems in which one logic may be defined in terms of other logic. For example a particular technology for asynchronous logic may thus be employed using a variety of fault tolerant logic and physical technologies (such as specific ASIC families). Such parametric, constructive type systems representing logic greatly increase the range of implementation and realization options available to address design objectives given a fixed level of effort specifying technologies.

When encountering an operator or function within a design there may be multiple possible interpretations of the operator. Within type system theory, such operators or functions are said to be overloaded. The hardware/software tool must disambiguate among overloading alternatives to ultimately select a unique operator implementation using a overload resolution. Overload resolution conventionally considers the set of visible operators, the types of all operands, and the return type. As operators may appear with arbitrarily nested expressions, complex statements and design blocks using parameterized types, conventional over-load resolution algorithms can be complex but are well known in the compiler literature. Herein we teach the additional constraint on overload resolution using comparative optimality among otherwise visible operators based on objectives specified in the design intent. For example, two different implementations of an addition operator may be visible and satisfy the argument and return types. One has a high probability of producing a correct result, however it results in a large area and time penalty. The other operator has a lower probability of producing a correct result, however it is smaller and faster. Based on the governing objectives for reliability, area and latency the designer or hardware/software design tool must disambiguate between the candidate operators at a particular point of use.

Attributes may be associated with types, values, state and operators. Attributes evaluate to values used to configure and select among overloadings. For example, an addition operator may have attributes specifying the area, latency, reliability or other properties of the operator. These attributes may trivially be literals (such as 5 nanoseconds). More commonly they are complex expressions taking into account the actual types and subtypes used to construct the type(s) associated with the operator. Ideally the attributes are independent of the actual values used within the type's domain (simplifying compilation or synthesis), however with somewhat greater complexity in the hardware/software tool and resulting hardware realization the attribute values may be dynamic. The resulting hardware may resolve to more than one operator overloading depending on the time-varying value. Division by an integer divisor is a common example; if the divisor is a power of the representation base then the division operator can use a fast shift implementation otherwise it may use a more complex reciprocation implementation. Such optimization techniques are well known to logic and physical technology designers; the innovation taught here is a means to capture these alternatives within a design-independent representation and corresponding hardware/software tool.

Type (and subtype) definitions may usefully be embodied in the package or library mechanisms frequently supplied by HDL or programming languages to structure visibility. Language-specific visibility mechanisms may globally or locally make declarations denoting a type or subtype (by name) visible inside a specific region of a design. If the visibility rules and design make only one type or subtype visible fitting all of the overloading criteria, the particular technology used to embody the local design intent is manually bound by the designer; the designer will get exactly what is denoted by visibility. Alternatively the hardware/software design tool may either bring types into visibility (automatic binding of technology to design) or may disambiguate between various overloading alternatives to optimize a design around implicit or explicit design objectives.

With the above, design-independent representation of logic and physical technology in mind, we will teach a variety of specific, novel language mechanisms (invention) providing for:

Technology-specific representation of implied state
Referencing of implied objects
Assignment overloading
Sub-Reference overloading
Other operator overloading
Literal overloading
Convergence
Persistence
Type and structural binding
Specifying multiple and general purpose processors The next major section will explain how these language mechanisms may be used by a tool (also part of the invention) to efficiently translate design intent into an optimized realization.

Technology-Specific Representation of Implied State

Many useful technologies augment the behavioral data type representation with implicit, technology-specific data.

Examples include the addition of a separable error detection and correction code (such as ECC), handshake signals used in many forms of asynchronous logic design and signals used for debug or performance profiling but not intended to be part of the realized end product.

In the prior art, such signals are either implicitly incorporated by a design tool customized for specific logic technologies (perhaps as a preprocessing step) or are explicitly denoted in the design. Implicit incorporation within a tool greatly limits the ability of third parties to add new and valuable technologies to the range of techniques the tool supports. Explicit denotation, such as additional signal declarations, increases the design and life-cycle support cost based on the additional code volume and makes it difficult and expensive to consider the local and global advantages of applying specific technologies not initially contemplated by the designer or to insert state solely during a debug or performance analysis phase. Such constraints are undesirable.

In the present invention, one or more implied identifier, implied subtype and optional implied initializers may be associated with a type or subtype definition. When an object of such type or subtype is created, implied objects declared within a limited visibility scope, of the implied identifier, implied subtype and implied initializers are also created.

Referencing of Implied Objects

Implied objects are defined within a name space unique to each explicitly declared object having a subtype with implied identifier, subtype and optional initializer tuples. Such implied objects may be referenced by some means that designates both the explicitly declared object and one or more implied tuples (in hierarchical order).

In general the full range of operators defined for a given type must be overloaded to handle implied objects appropriately. In addition, indexing, assignment and other capabilities must often be overloaded, even if the base language does not provide for their overloading.

Assignment Overloading

The behavior of signal and variable assignment operators or statements (depending on the base language) must generally be capable of being overloaded based on the base type being assigned and the kind of the target and value. The overloaded signal assignment is executed after evaluating the value in the waveform element and before scheduling defined by the assignment target's implied semantics.

Sub-Reference Overloading

Most HDL and programming languages provide for reference to zero or more components within an object of aggregate type. For example a program or design may refer to the first element or elements two through five of an array. Such sub-references may appear on either the left (lval) or right (rval) of a statement. Such sub-references often must be overloaded by some means to achieve the intended technology specification objectives. In the absence of overloading the normal sub-reference rules apply as defined by the base language.

Other Operator Overloading

In order to fully define a technology's semantics through a new type, generally all other operators which may be used in a design must be overloaded for the technology's type. When an operator is referenced in a design but not overloaded either an error may be reported or the default behavior defined by the base language may be used.

Literal Overloading

Some technologies must overload the means by which literal values are introduced into a design. For example, using clocked logic a suitable encoding of a literal value may either be applied directly to the inputs of an adder whereas an adder defined using an asynchronous protocol will often require an implicit handshake to avoid dead lock.

Convergence

Processes, process equivalents and threads of control generally begin at a well-defined statement (entry or resume point) and execute until suspended, joined or complete. Typically such well-defined statements are the first statement in a body or the statement immediately after suspending on time or a condition. Some technologies require that a process or thread execute from the same or distinct entry points more than once until a convergence criteria is met.

Examples of such convergence requirements include "pass-gates" and "zero-delay" handshaking within an asynchronous logic technology. When the control terminal of a pass-gate is enabled, the left and right sides of the gate are "short circuited" and must reach a convergent state. In an asynchronous logic technology signals may flow forward and handshakes backward within a logic cone until either the circuit reaches a steady state or the output is sampled.

Some means may be provided for iterating under program control between entry/resume points and suspend points within a process, process-equivalent or thread. After resuming, if a process executes a sequential specific postponed statement before executing a wait statement, the enclosing process, process-equivalent or thread is "marked". Subsequently, when reaching the next explicit or implied wait statement, the process immediately continues, without waiting, by executing beginning at the sequential statement at which it previously entered or resumed.

Some means must be provided by which statements executed dynamically within a process, process equivalent or thread can determine if the execution is within an initial or a postponed re-iteration of the same statement. This mechanism must be accessible within subprograms (functions and procedures) called dynamically within the process, process equivalent or thread.

Persistence

Persistent state retains information even when "input" changes state. Common structures implementing persistent state include edge-trigger registers, level-sensitive latches, addressable register files, variables, static memory, dynamic (heap) memory and even sequential access storage (such as hard drive systems). In the prior art, such as IEEE Standard 1076.6 (IEEE Standard for VHDL Register Transfer Level (RTL) Synthesis), such persistent state is represented in a design specification by HDL specification code which defines specific behavior of the persistent state, such as the edge triggered latch.

```
Process (clock)
Begin
    If (reset = 1) then
        Q <= '1';
    End if;
    If (clock'event and clock = '1') then
        Q <= D;
    End if;
End;
```

Defining the specific behavior of persistent state using such prior art has two significant disadvantages. First the specific behavior occupies significant code volume which must be generated, maintained and processed by each tool handling the design. More significantly, optimization of the persistent state requires the identification of each applicable instance and suitable modification. The fragility and effort associated makes it more difficult to retrofit and combine various technologies in order to optimize a design toward evolving design goals.

Disadvantages of the prior art are remedied by the present invention in which a conceptual paradigm for the desired persistence is associated with a type or subtype. The conceptual paradigm may be interpreted differently based on the actual type definition visible when an object of the persistent type is declared. The conceptual persistence denoted in the type or subtype indication takes the form of a subprogram call. Parameters supplied within the call may override aspects of the persistence such as the timing domain, reset value or even passivation using a disk or other quasi-perpetual storage.

Third parties may provide various technologies, perhaps embodied in packages such as logic above. Examples of such logic technologies include persistent state with test or diagnostic scan chains (such as IEEE Standard 1149 JTAG), fault tolerance (such as parity, replication, modified Hamming (ECC) or more complex encodings), asynchronous logic (wherein the persistence subprogram explicitly or implicitly includes handshaking/acknowledgement or other protocols), hardware profiling information (wherein the persistence subprogram includes counters or connections to more global data gathering resources). By locally modifying object subtype or visibility, either a human or (more significantly) the tool may transiently analyze the behavior resulting from use of various bindings in order to most optimally satisfy specific goals set by an external agent (designer or tool). Examples of such goals include minimum power, minimum latency, maximum reliability or enhanced test observability.

The latest programming and hardware description languages are adding powerful mechanisms for type generics or parameterization, such as ANSI C++ (templates), Accelera's SystemVerilog and IEEE's VHDL-200x effort. When combined with type generics or parameters, the innovative embodiment of persistence within subtypes taught above enables definition of structural components which can transparently be combined with many different kinds of persistence. For example, this allows definition of a Fourier transform class (C++ programming-oriented example) or a specialized arithmetic logic module or entity/architecture (hardware-oriented example), then creating instances of such classes, modules or other structural units using forms of persistence which were completely unknown when the original class or module was designed. These combinations are particularly powerful when automatically permuted by a tool capable of experimental permutation and analysis searching to optimize for specific goals, such as the one taught here.

Type and Structural Binding

To maximize design efficiency, behavioral design specifications often use types distinct from the types actually used in code compiled for a multi-purpose or general purpose processor or synthesized logic. More generally the data types used in a behavioral specification may map into many different implementation technology types depending on the particular logic technologies used by the hardware/software design tool in order to maximize goals. For example a behavioral integer ranging from −127 to +128 may be compiled into a larger, signed two's complement provided by a general purpose processor, into an eight bit signed two's complement for a multi-purpose processor, into nine bits of sign and magnitude or even into 256 distinct, mutually exclusive wires (such as used by some asynchronous logic technologies).

In prior art, the mapping between types uses in the design and those used in compiled code or synthesis implementations are either determined for a fixed set of types when the tool was created or are configurable by annotating the source code (such as a C++ compiler's long int data type or System Verilog's shortint) with a predefined set of data types. Neither approach accommodates arbitrary mappings between user-defined data types. This limitation both constraints the designer's ability to choose arbitrary data types best suited for the design task and for logic and physical technology developers to choose unusual implementation data types conferring desirable optimization properties.

The innovative step taught here augments a user-defined type or subtype by a clause explicitly denoting another, previously defined type used to implement the type being declared during the synthesis of objects having the specified base type or a derived subtype.

User-defined data types may be recursively mapped to other user-defined data types, however before synthesis can complete the recursion of operator subprograms must terminate in an operator subprogram that contains a clause into a structural cell implementing the operator subprogram's functionality or parameters to a dynamic cell generator.

Specifying Multi-Purpose and General Purpose Processors

In order to generate binary executables for multipurpose or general purpose processors, specifications for the processor's instruction set architecture and optimization opportunities must be embodied within the code generator (tool's second operating mode) in sufficient detail and with sufficient accuracy to generate correct and ideally optimized executables.

Prior art either directly embodies specifies of a particular instruction set architecture within the tool or relies on parsing and automated generation using a machine description file. In the first form, common with many production quality compilers, the processor specification must be altered by the compiler developers or maintainers to reflect new or even unanticipated processor modifications by the tool developers then recompiled; third party modifications are not feasible except through time consuming and impractical assembly code modification. In the second form, represented by the GNU compilers and their derivatives, a set of instruction set architecture specifications are processed to yield intermediate code (C), which is then compiled and linked to retarget a compiler. In the later case third parties can and often do modify the machine description, however the only means of debugging and testing the compiler is to compile and run source code in a regression mode; debug of the results is an expensive, manually intensive effort. This approach either requires availability of a suitable target processor or a separately developed simulation of the processor. Frequently this delays availability of a code generator. In the case of processor instruction set architectures which may be dynamically modified by adding or deleting unanticipated instructions, development of a code generator is difficult or infeasible.

The innovative step taught in this patent application uses a stylized design for the target processor, specified using a standard or augmented hardware description language, to (1) simulate a processor, (2) generate an optimized code generator and (3) synthesize a processor implementation from the same development effort. Using a single specification for all three helps to insure that a rapidly evolving instruction set will have a consistent simulation, compiler and reference implementation from a single effort. Furthermore, since the machine description language, a hardware description language, is already familiar to the designers, the weeks or months of learning commonly experienced with compiler-specific machine descriptions in the prior art are avoided. When a reference processor implementation needs to be simplified to meet size, power or other requirements under the constraints of a limited usage, the customization process can be almost fully automated via an integrated process consisting of (1) code profiling on a full reference processor, (2) elimination of state and instructions in the target processor which remain unused or underutilized (3) generation of a new processor simulation, compiler and implementation. When a compiler is needed for an existing processor architecture, the HDL-based specification can be validated by executing known-good code on a simulation derived from the specification creating a code generator. When the simulation clears this regression, a compiler and implementation can be automatically generated with high probability of initial correctness. This feature is particularly important when creating a new model of an existing processor architecture (for which compatibility must be maintained).

Tool Operating Modes Using Language Augmentation

Drawing 1 illustrates the overall flow diagram for invention's four operating modes. Critically, both designs (1) and technology specifications (2) can be supplied by end users or other third parties as HDL or programming language source code using augmentation of existing programming or hardware description languages taught above. An intermediate library system (4) may be used to retain technology information for reasons of performance or intellectual property protection. During any of the four operating modes the design is brought into a working database (5) containing an intermediate form of the design and available technologies. Any of the four operating modes (6, 7, 8 and 9) may be practiced on the database (5), yielding hardware configuration and software memory configuration data used to produce products meeting the design specification (1).

Model Verification & Optimization Operating Mode

The model verification and optimization operating mode enables behavioral analysis of a design using available logic technology specifications. Various logic technologies may be applied to a design by altering the types associated with objects and statements within the intermediate form. The resulting type hierarchies are then re-evaluated, generally leading to new overload resolutions and thus operator implementations. The type hierarchy must always be resolved down to either a fully defined behavioral or structural view for simulation or analysis within a design partition. The new overload resolutions generally alter the evaluation of attributes within both the design objectives and the utilized technology, leading to an alteration of each analysis view (such as reliability, power, timing, etc).

Alternatively the tool may conditionally alter bindings within the design using a search process to better meet the design objectives. Multivariate search algorithms are well known in the literature including hill climbing starting with the original bindings, genetic algorithms and other techniques. At each cycle of the automated optimization, a set of consistent type bindings must be achieved, then the resulting attribute values evaluated to achieve a measurement of the quality achieved by a given type binding. Some type bindings may not progress beyond initial type satisfaction requirements, for example a combination of type bindings for which no type conversion is defined. A collection of type bindings represents a particular application of available logic technologies to the original or derived design specification. Derived design specification result for a partial application of type bindings, such as the application of fault tolerance to a binding that already uses a type binding representing a particular asynchronous logic technology.

Embedded Executable Partitioning and Compilation Mode

Partitions of a design may be bound to one or more embedded or general purpose processors. For simulation, the entire design must be bound to available, general purpose processors. For emulation, segments of the design may be bound. Even in the final hardware configuration and software memory configuration output (Drawing 1, 10) processor binaries must be compiled for use by processors embedded in the final design.

Critically, the present invention uses an executable model of each target processor architecture (or parameterized for architecture variants) to formally specify the architecture. This allows end users and third parties to create models of new or variant architectures, then simultaneously generate an executable model (for simulation and formal methods analysis even if actual hardware does not exist), a complete code generator, a disassembler (used for debug) and a synthesizable processor implementation suitable for transformation using various logic and physical technologies to better optimize for design objectives.

Logic Partitioning, Synthesis & Optimization Mode

The logic partitioning, synthesis and optimization operating mode utilizes search mechanisms functionally identical to the model verification and optimization mode except that all type hierarchy bindings must be expressed in terms of terminal structural components such as a processor, FPGA logic element or ASIC element. Bindings which do not have such terminals are non-viable; no analysis of attributes is useful. It is important to note that such non-viable bindings may result from either a manual or automated search process.

Post-Synthesis Verification Mode

Post-synthesis verification modes evaluate the behavior and attribute values taking into account both logic technology and (optionally) physical technology bindings, however the underlying mechanisms are identical to those used earlier. The attribute evaluations are qualitatively more complex as the type and thus operator overloading hierarchies are generally deeper. For further optimization at greater computational cost, multiple logic, synthesis and optimization partitions and bindings may be evaluated and used to prune and direct higher level search trees.

DesignViews provides the graphical manifestation of 3, 4 and 5. ModelViews provides the graphical manifestation of 6. ImplemetationViews provides the graphical manifestation of 7 and 8. PhysicalViews provides the graphical manifestation of 9. Each of the four collections may have multiple instances. Tabs provide for actions and examination of distinct views such as the technology binding, simulation, power analysis, reliability analysis and other characteristics.

Figure 3:
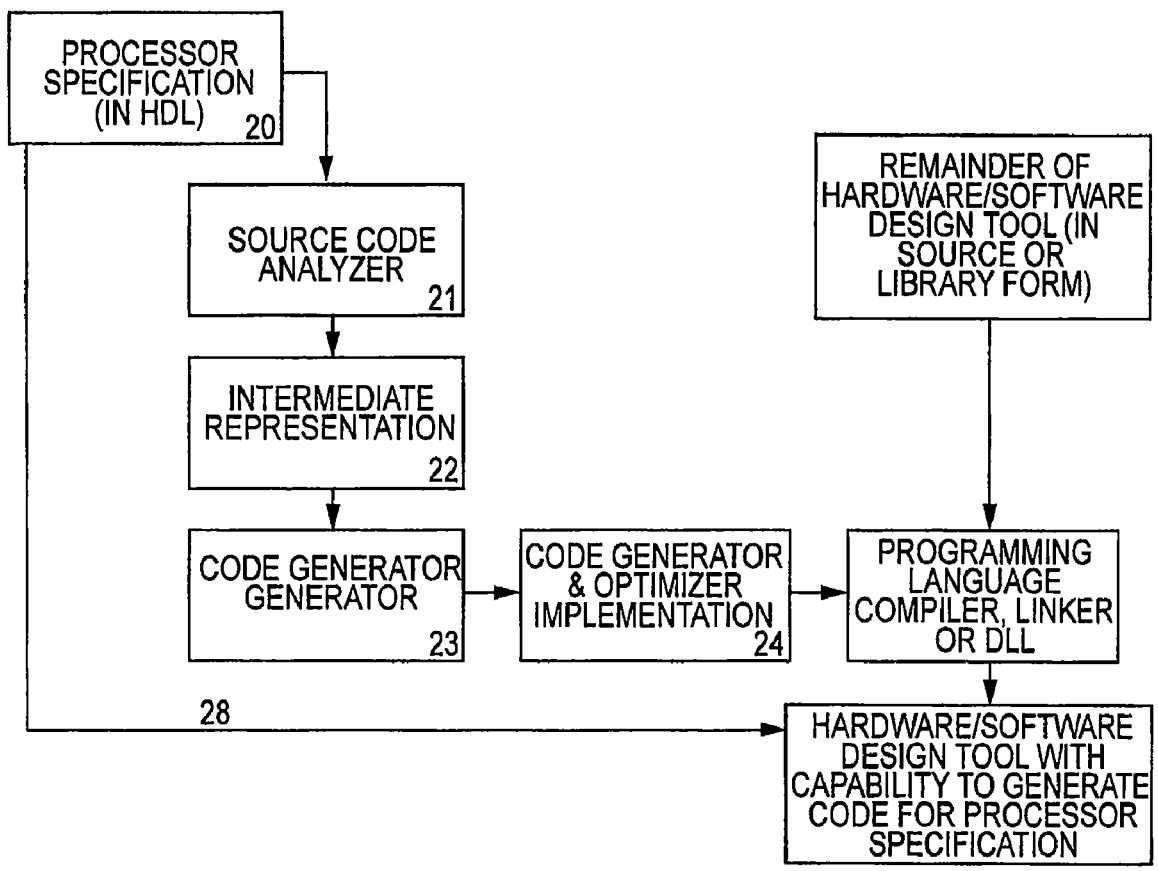

FIG. 3 illustrates that the specification for a processor begins with a behavioral, HDL representation of the processor architecture (20). The HDL is analyzed (21) using (3) into an intermediate representation (22) contained in 4 or 5. A code generator (23) uses the model to create an intermediate representation (generally in a programming language) representing the compiler backend specific to the processor described in the HDL model. This backend must be compiled and linked (statically or dynamically) with the remainder of the design tool, yielding a complete design tool with the capability to generate code for the input processor specification.

Figure 4:
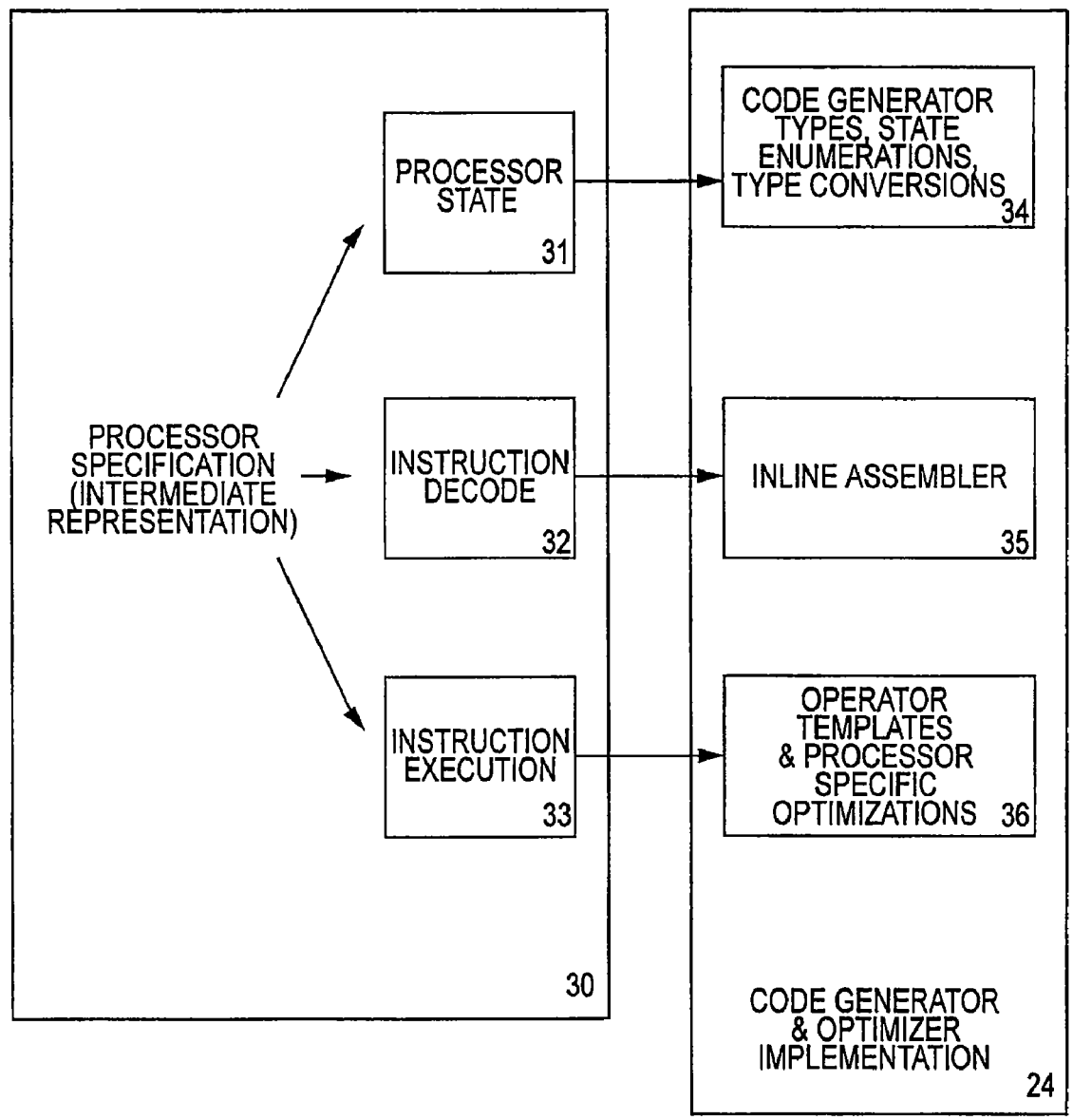

FIG. 4 illustrates that details of 23, shown as 30, extract the processor's intermediate representation (22) into a processor state such as the architected processor registers (31), the instruction decode (32) and the instruction execution (33). In the Code Generator and Optimizer (24), the processor state (31) is converted into types used by the resulting code generator, enumerations of the processor's state (such as an enumeration for each register) and appropriate type conversions (such as from a full integer to a limited range integer used in an instruction's immediate field). The instruction decode segment of the processor specification converts in an inline assembler (35) and disassembler by reversing the sense of nested case statements. The entity/architecture or subprograms defining algorithmically how to execute each instruction or instruction family (33) convert into operator templates and optimizations specific to particular processors using well-known template-based code generation algorithms and other context-specific code generation optimizations.

Figure 5:
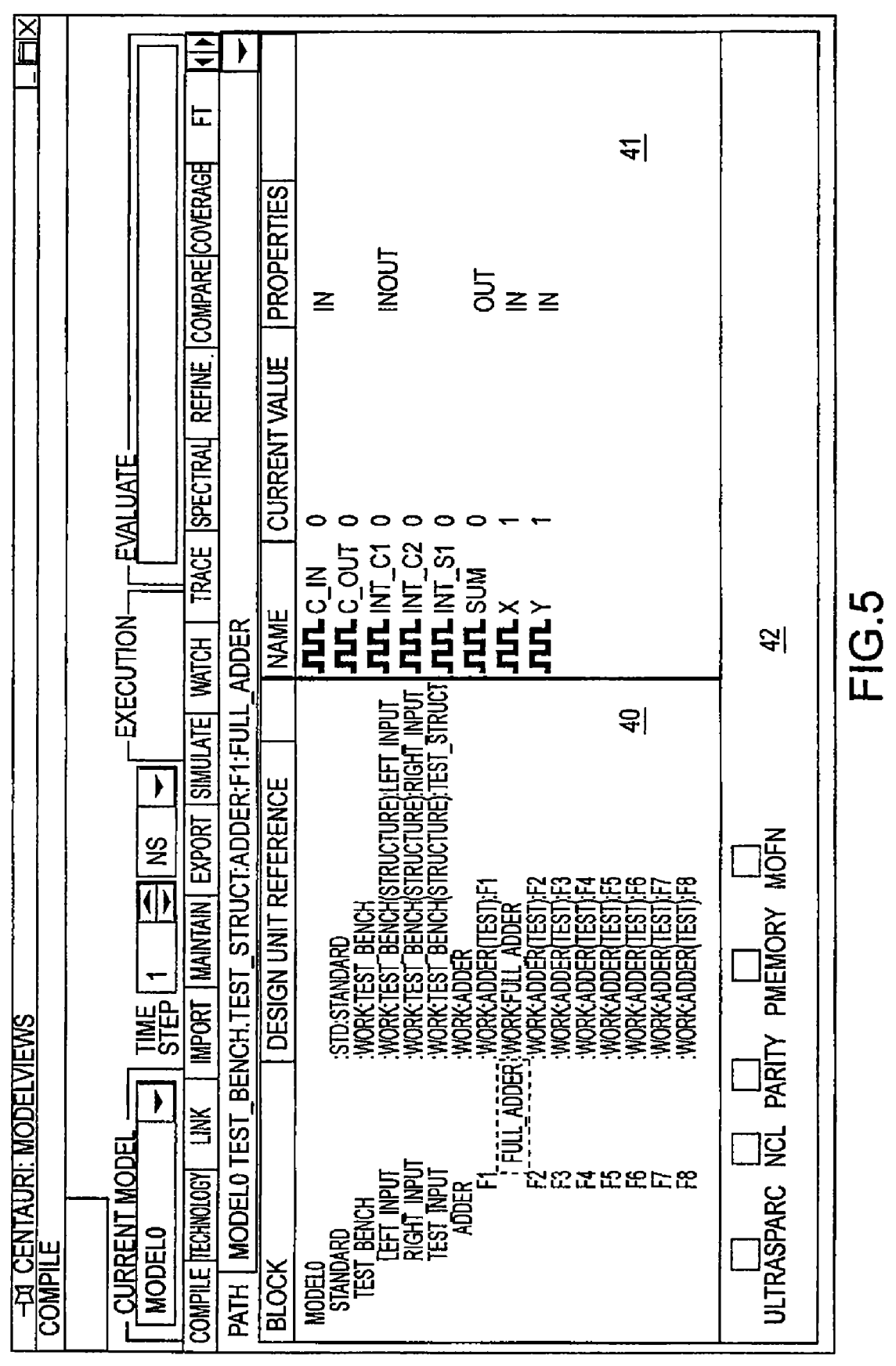

FIG. 5 illustrates that based on the technologies specified in the database (5), ModelView presents a menu of available technologies (generally mapped one to one with library units in the database resulting from analysis of technology specifications). Consistently in this and subsequent views, the color of blocks (40), statements and objects (41) denotes the technologies to which the block, statement and objects are bound for behavioral analysis. The compiler initially assigns technology bindings so as to gradually optimize the objectives specified in the design specification (1) through transformations in the interpretation of types visible in each elaborated instance of the block, statement or object. Conventional type conversion functions provide for interfaces between distinct types (such as converting parity logic to non-parity logic. The user may over-ride the automatic bindings by dragging and dropping technologies (actually type systems) from the palette (42) to the blocks (40), statements or objects (41) so as to force specific bindings based on designer bias or results from model view analysis. More detailed popups containing localized results of analysis are available via a right click pulldown menu, allowing for presentation of tab-specific analysis results beyond the immediate values shown in the value pane 41.

Figures 1, 6:
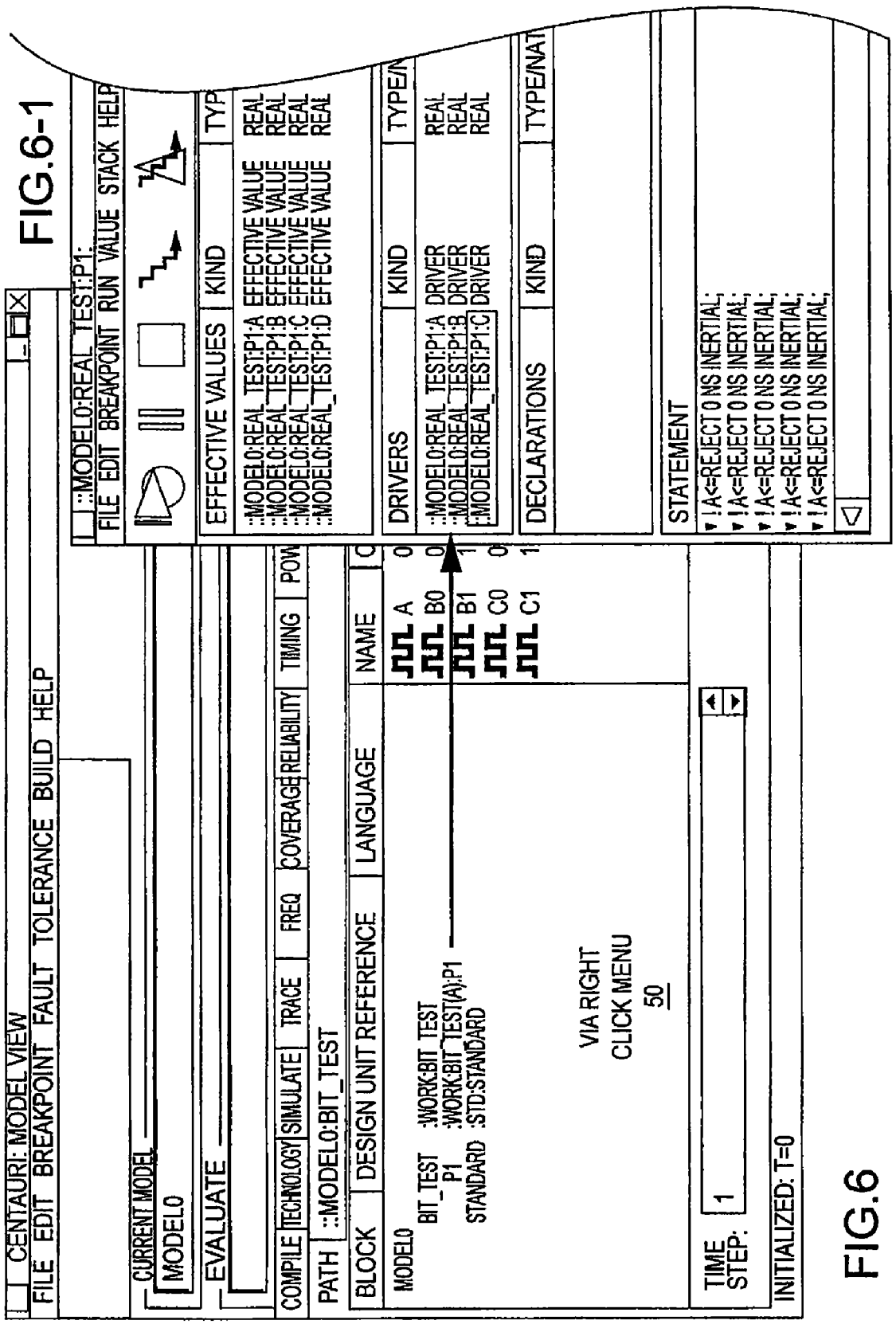
Figures 2, 6:
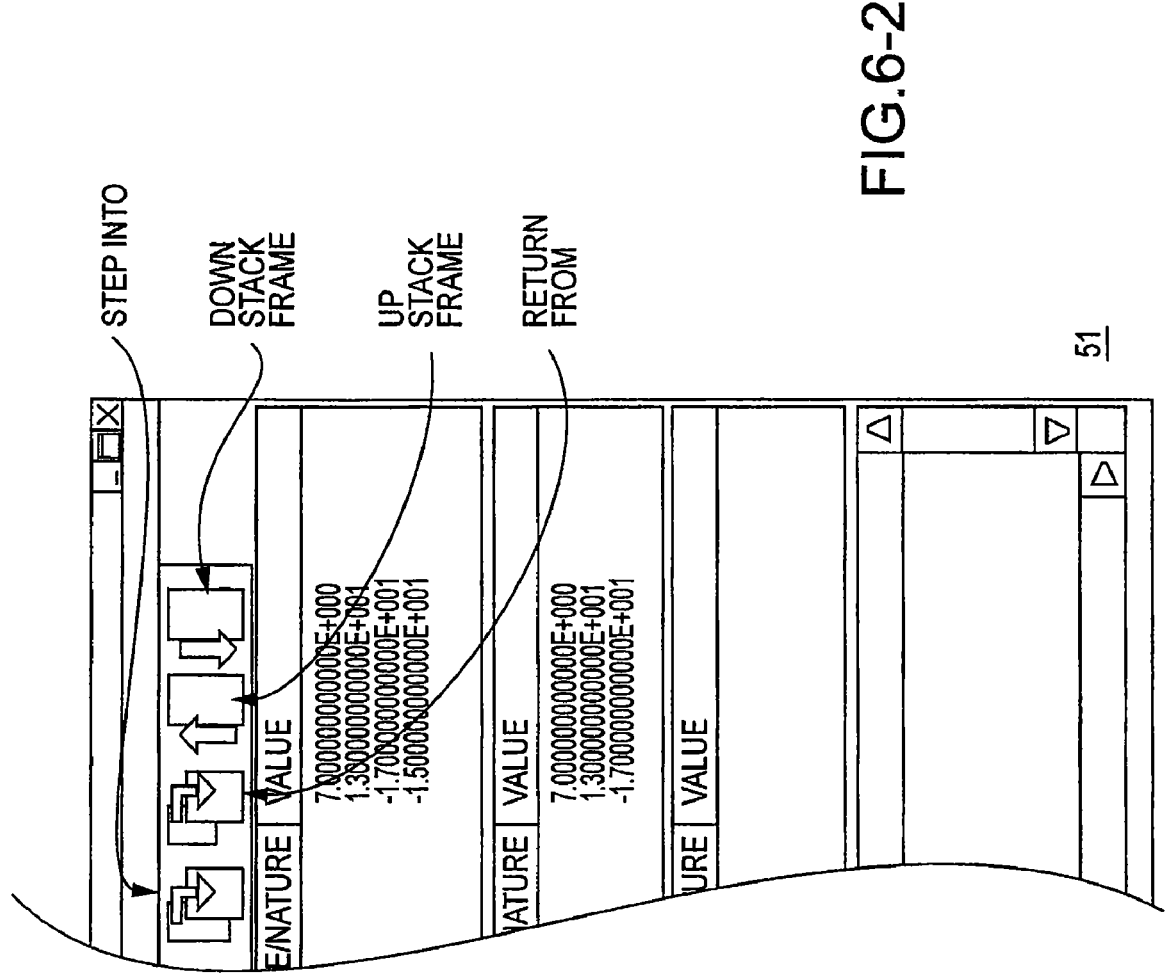

FIG. 6 illustrates that right click menus associated with each object in the graphical interface provide analytic visibility into other aspects of the design, such an interactive debugger view into a process, process equivalent or thread. The debugger provides for more detailed visibility and interaction (such as time, value or statement breakpoints).

Figure 1:
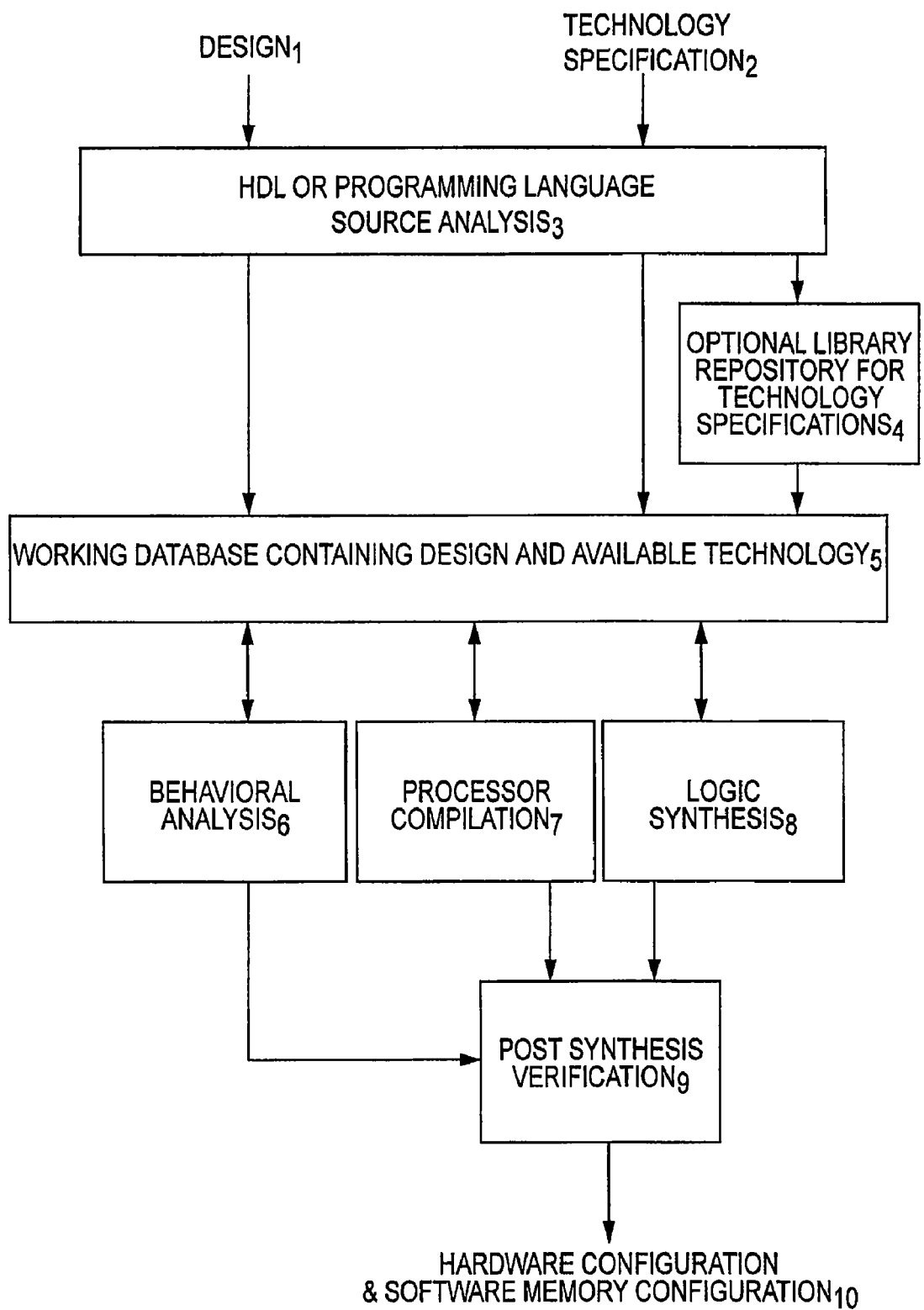
FIG. 1 illustrates an overall flow diagram for invention's four operating modes. Critically, both designs (1) and technology specifications (2) can be supplied by end users or other third parties as HDL or programming language source code. An intermediate library system may (4) may be used to retain technology information for reasons of performance or intellectual property protection. During any of the four operating modes the design is brought into a working database (5) containing an intermediate form of the design and available technologies. Any of the four operating modes (6, 7, 8 and 9) may be practiced on the database (5), yielding hardware configuration and software memory configuration data used to produce products meeting the design specification (1).
Figure 2:
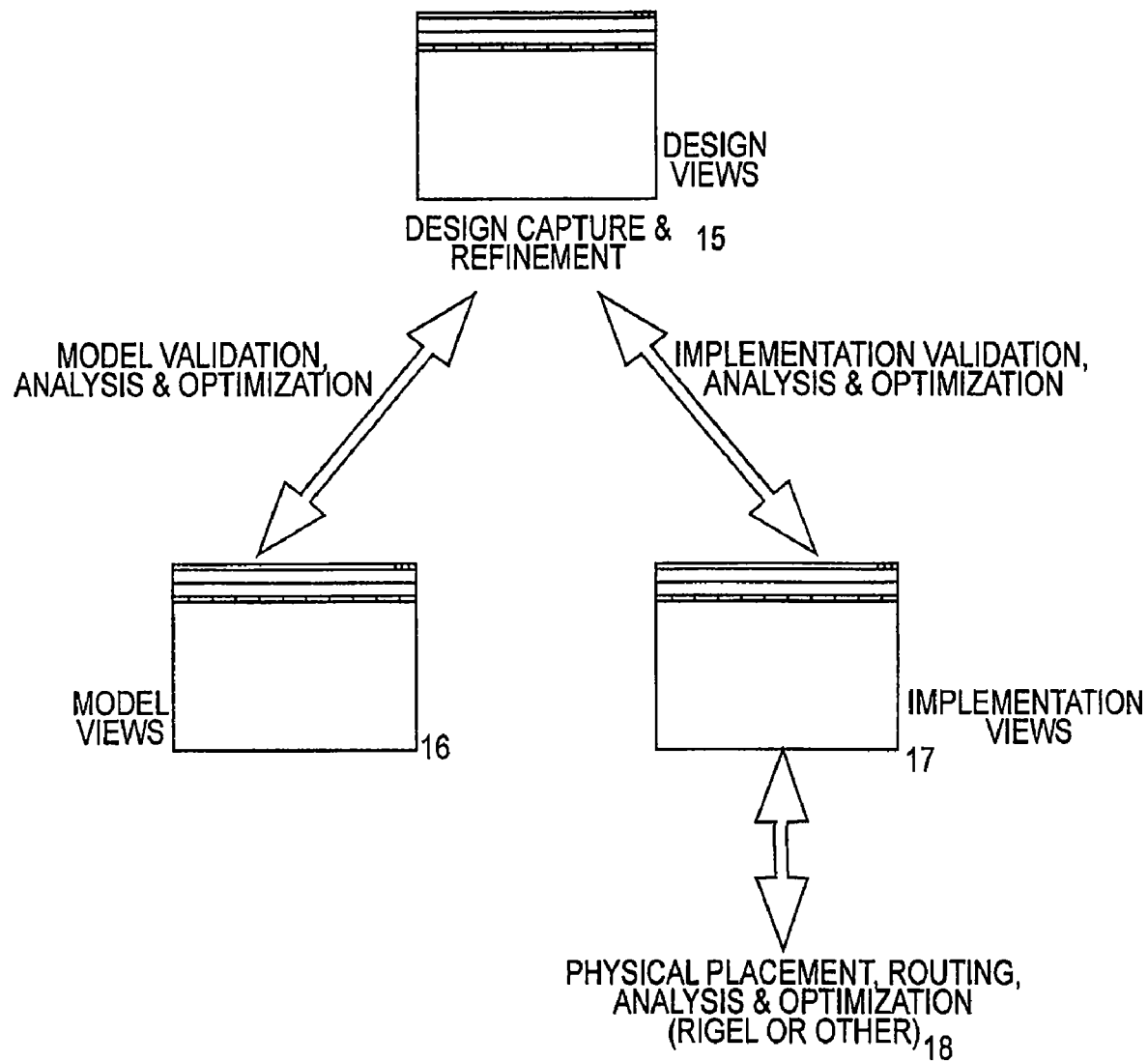
FIG. 2 illustrates that the user interface consists of four collections of functionality, DesignViews (15), ModelViews (16), ImplementationViews (17) and PhysicalViews (18).
Figures 2, 7:
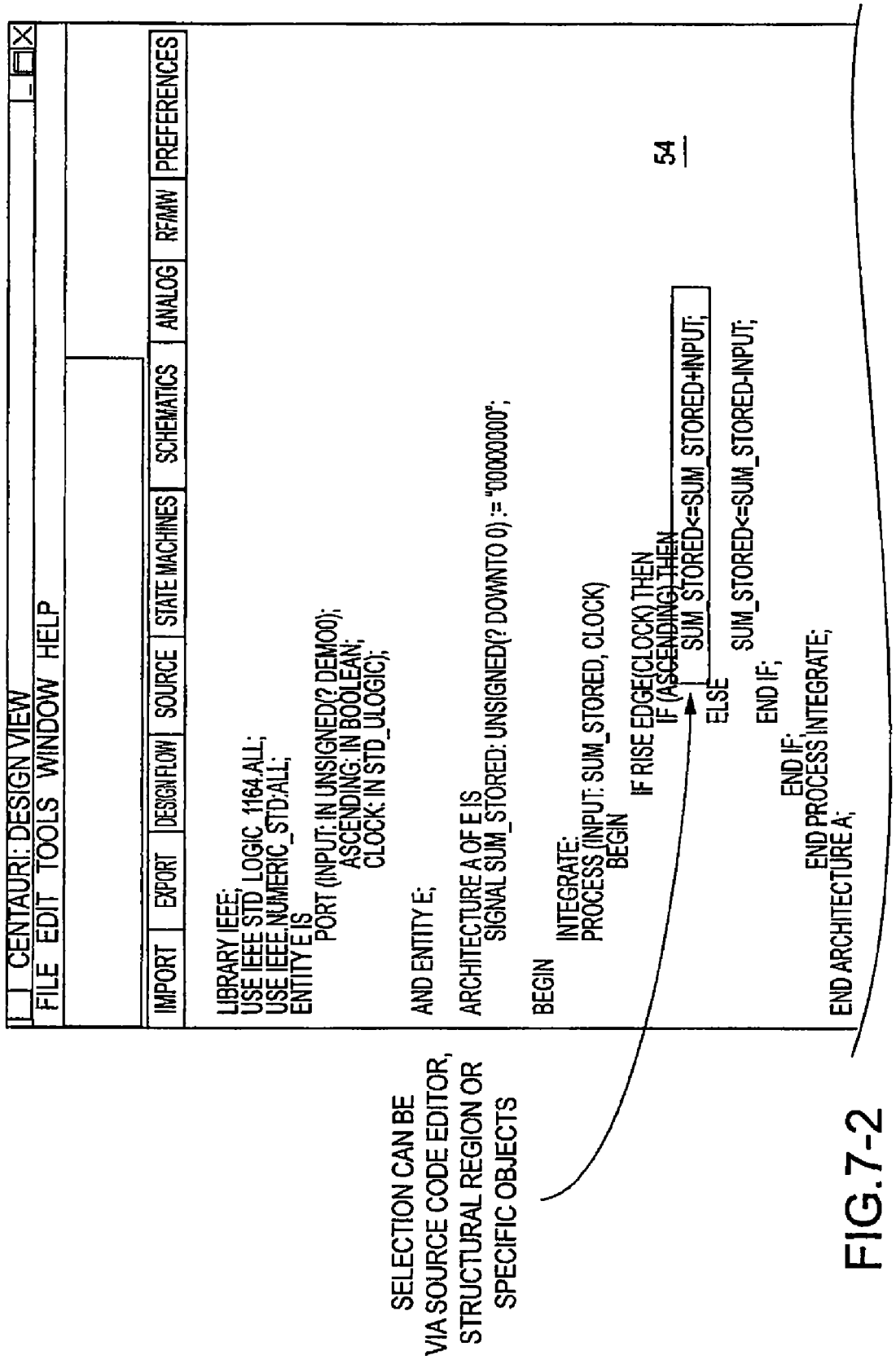

FIGS. 7-1 through 7-3 illustrate that blocks, statements (concurrent, sequential and simultaneous) may be selected via the hierarchical block pane (52), the object pane (53), containing objects in the block selected by 52 or a source code pane displaying source code for the elaborated block shown in pane 54 (within the Design View). For programming languages, blocks may take the form of subprogram calls, template instances or sequential control such as a loop.

Figure 8:
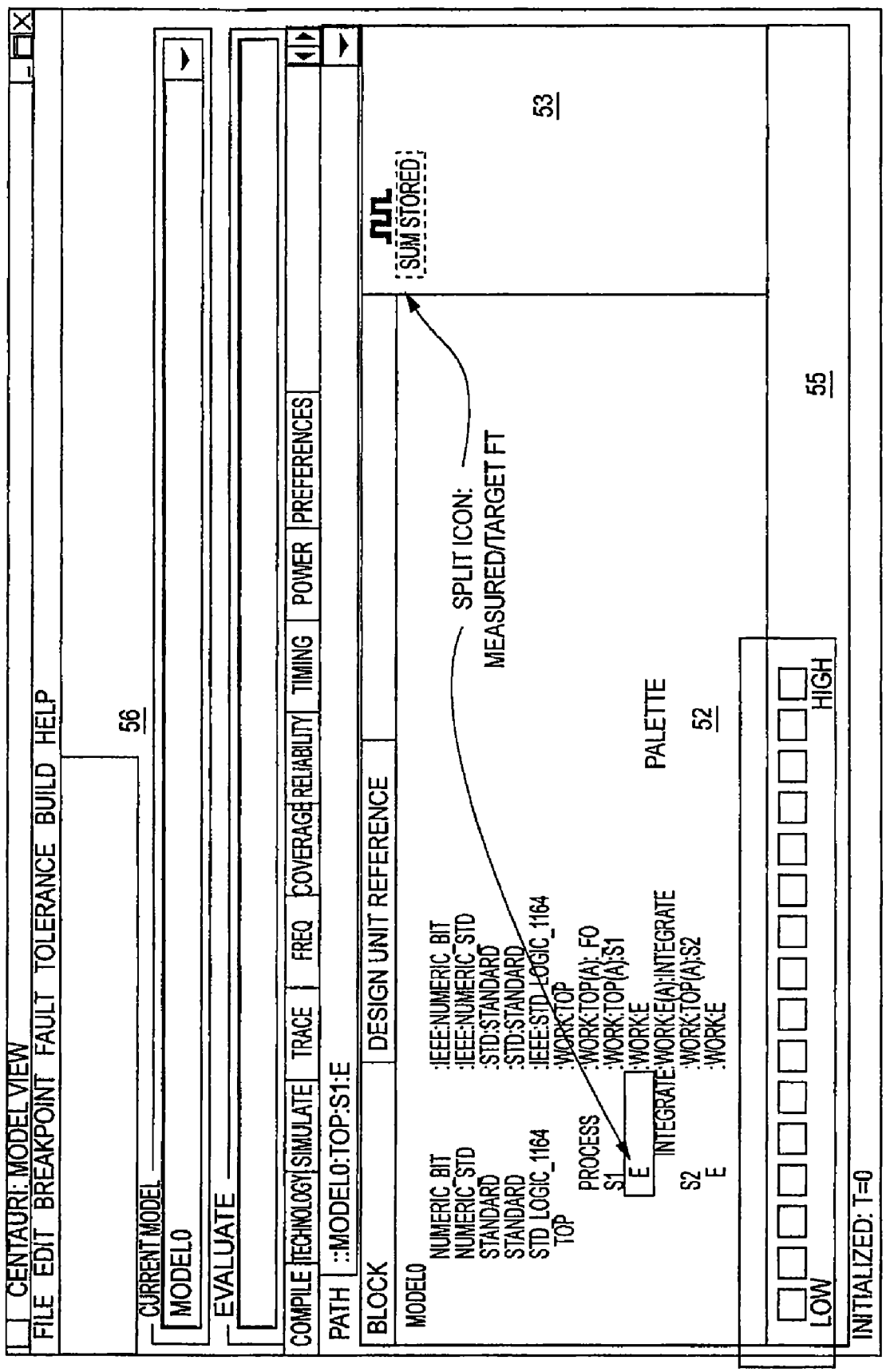

FIG. 8 illustrates that multivariate algorithms for incrementally solving constraints, such as are presented by the combination of evaluated attribute values, design objectives and actions via the graphical user interfaces (15, 16, 17 and 18) are well known to the designers of large scale analog simulators and are employed by the current invention with little change. Often the combined set of constraints can only be satisfied within a tolerance. To graphically depict the difference between objective and analysis result values, each icon is capable of split colors (such as 53). Both colors are drawn from the current tab's palette. One portion of the icon color represents the tab-specific objective, the other part of the icon represents the current result of analysis. This may be generalized to icons with more than two color bands. As objective and measured values converge using the internal (analog) solver, the icon will assume a continuous color. Icons associated with a block are banded to show the disparity of values associated with all blocks, statements and objects contained within the block (summary of disparity between objective and actual analysis).

Figure 9:
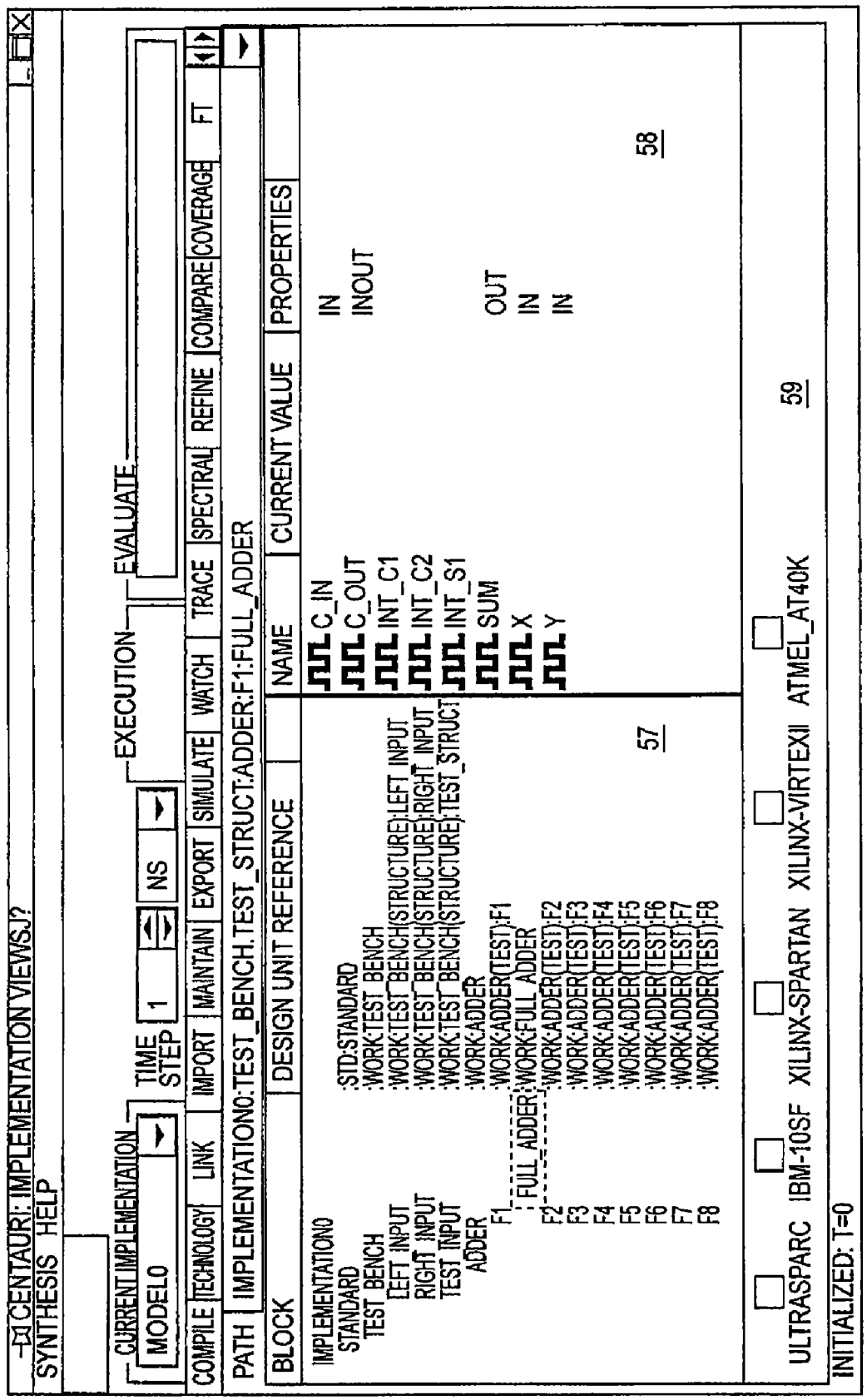

FIG. 9 illustrates that within the implementation view, another technology tab allows both observing and manually binding (constraining) blocks, statements and objects to particular physical technologies, again denoted by available (visible) types in the database, shown graphically on the physical technology palette (59). Analogous to the operation of binding in Drawing 5 of logical technology, physical technologies may be automatically selected based on evaluation of attribute values against objectives specified as (HDL) attributes within the design.

Figure 10:
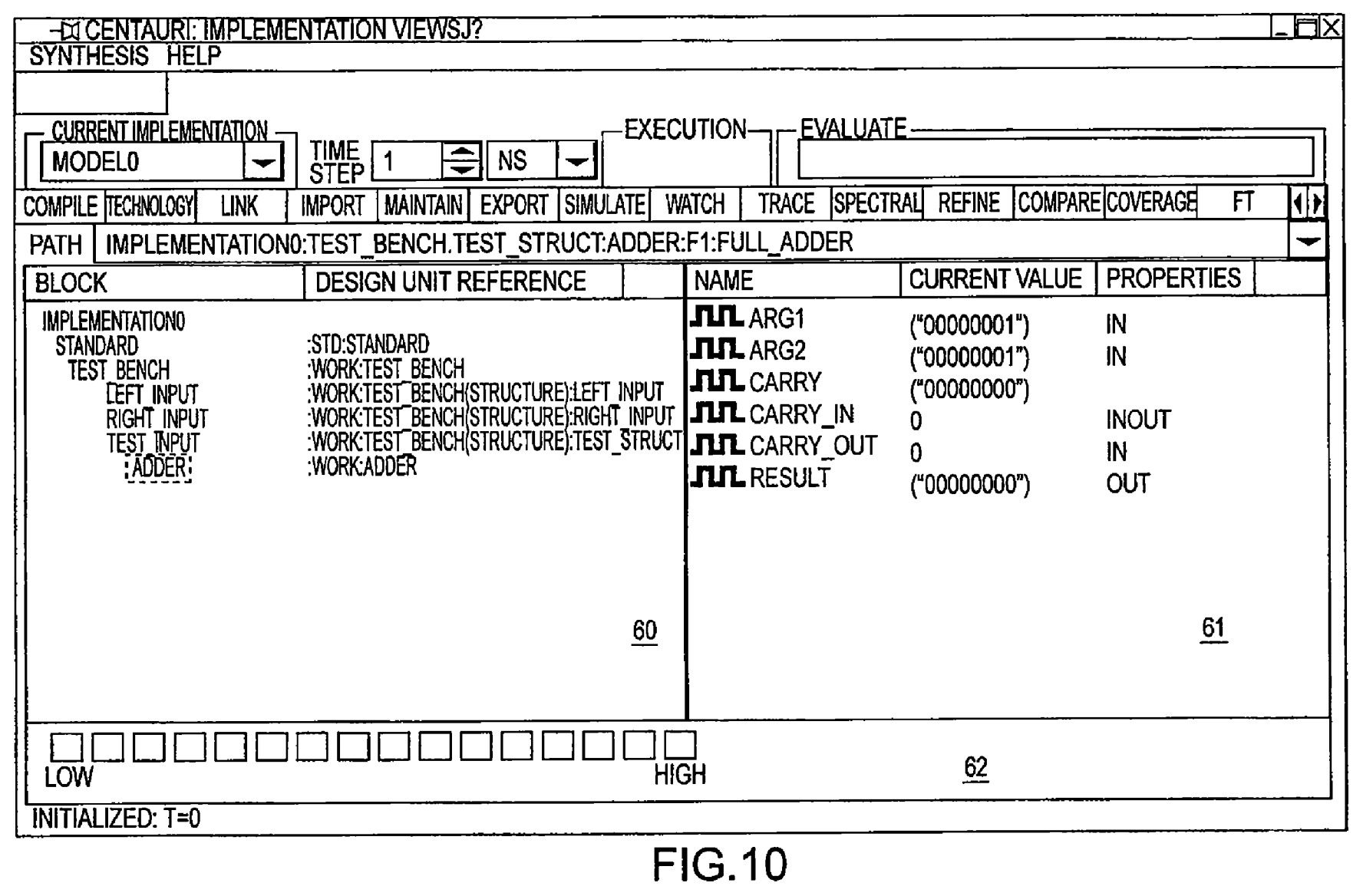

FIG. 10 illustrates that analogous to the analysis of property-specific tabs in ModelView, the color of blocks, statements and icons in each of the analytic views of ImplementationView denotes the objective and analyzed constraints (such as the reliability view shown in Drawing 10). The primary difference between tabs in ModelViews and ImplementationViews is the additional incorporation of attribute values associated with specific physical technology bindings (type bindings internally).

Figure 11:
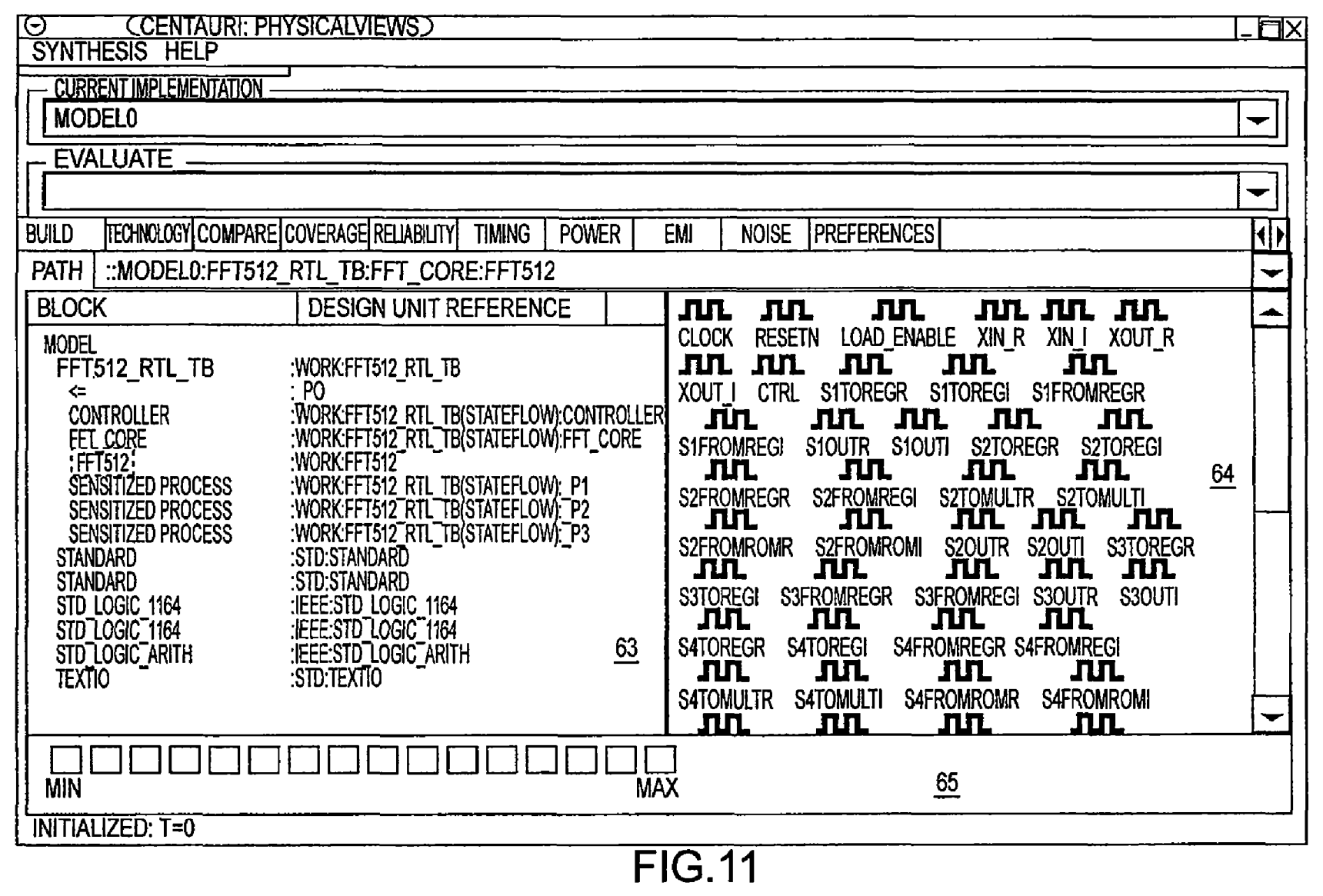

FIG. 11 illustrates that tabs within PhysicalViews operate analogously to tabs in ModelViews and ImplementationViews except that the analysis takes into account physical design information such as actual estimated point-to-point transmission delay, power after physical design is taken into account (such as driver or transistor sizing), parasitic and radiated noise and comparable properties.

DETAILED DESCRIPTION OF THE INVENTION

The preferred embodiment of this invention consists of two inter-related parts. First, several innovative augmentations to conventional hardware description languages or programming languages distinctly specify design intent, logic technology and physical technology. These language augmentations serve to externally extend a tool to innovatively utilize and optimize using technologies which are not embedded within the tool. The preferred embodiment will utilize a common hardware description language, VHDL, however those familiar with other programming languages or hardware description languages will see equivalent constructs in many other languages. Second, an innovative design tool provides for incorporation of externally defined logic and physical technology specifications during four inter-related modes of operation: (1) behavioral analysis, (2) processor compilation (3) logic synthesis and (4) verification post-synthesis. The preferred embodiment refers to a particular implementation developed by the inventors using a specific GUI organization and C++ implementation, however those skilled in the art of tool design will readily see many other GUI organizations and implementations which practice the same invention.

With the above invention in mind, we will describe a number of specific language mechanisms (preferred embodiment) providing for:

Technology-specific representation of implied state
Referencing of implied state
Assignment overloading
Sub-Reference overloading
Other operator overloading
Literal overloading
Convergence
Persistence
Type and structural binding
Specifying multiple and general purpose processors Examples below use the IEEE Standard 1076 language, VHDL for illustration, however those familiar with other languages will recognize that the same concepts can either be applied directly to such other languages or a language with appropriate base constructs may be used to extend the type system, then referenced from another HDL or programming language with less powerful base constructs (such as referencing a VHDL technology type system from IEEE Standard 1364 Verilog).

The next major section will explain how these language mechanisms may be used by a preferred embodiment of the tool to efficiently translate design intent into an optimized realization.

Technology-Specific Representation of Implied State

One embodiment of the present invention augments a user-defined type by zero or more WITH clauses. For each explicitly declared object of the explicitly-defined type, an implicit object with a name scope local to the explicit type and any child subtypes designated using the WITH clause is implicitly declared. For example, each WITH clause has one of the following syntactic forms (using VHDL syntax):

WITH simple_identifier:subtype_indication optional_initializer
WITH CONSTANT simple_identifier:subtype_indication optional_initializer
WITH SIGNAL simple_identifier:subtype_indication optional_initializer
WITH VARIABLE simple_identifier:subtype_indication optional_initializer
WITH FILE simple_identifier:subtype_indication optional_initializer
WITH QUANTITY simple_identifier:subtype_indication optional_initializer where the subtype_indication must be a (locally or) globally static subtype. The optional_initializer assigns a default value to the implied state using the syntactic form:

:=static_expression;

In the absence of an optional initializer, the initial value of implied state follows VHDL's recursive 'left rules.

An instance of an explicitly declared object initiates a traverse of the object's visible subtype hierarchy, beginning with the object's subtype indication and continuing through each parent type until (and including) the base type. Any WITH clauses encountered in this traversal create an instance of an implied constant, signal, variable, file or quantity. The first syntactic form above create implied state (respectively) as a constant, signal, variable, file or quantity matching the kind of explicitly declared object to which the type or subtype indication is applied. Subsequent forms (such as WITH CONSTANT) create implied state matching the specified kind (constant, signal, variable, file or quantity) of the explicitly declared object. The kind of object must otherwise be allowable in the declarative region in which the declaration occurs. For example, in VHDL a WITH SIGNAL clause may not occur within the declarative region of a subprogram.

While traversing a single list of WITH clauses or the WITH clauses associated with a subtype hierarchy, multiple WITH clauses may be declared with the same simple_identifier. If the kind, simple_identifier, subtype_indication and optional_initializer match, such multiple clauses result in a single implied object. If the kind, subtype_indication and optional_initializer conflict, then an error must be reported. In particular, this allows a subtype_indication within an interface declaration to enforce a specific mode for an implied interface declaration. If the usage of such as interface declaration within the subprogram is incompatible with either the implied object or the interface declarations' mode, an error must be reported.

The above discussion of WITH clauses and implied objects may be generalized to implicit objects themselves having a subtype including WITH clauses such that multiple levels of implicit objects may be instantiated. This is important to enable constructive use of types denoting technologies in various combinations. Such as the transparent addition of a specific error correction technology to an asynchronous logic technology.

Implied objects may retain all of the properties of explicitly declared objects of the same kind. For example, in VHDL, this allows implicitly declared objects to be resolved using VHDL's existing resolution function mechanism. For example, this has important application to the joining of two micro-pipelines within an asynchronous logic technology. The logic required to combine the two streams may be completely contained with the asynchronous logic type's resolution function and signal assignment operators (described below).

The VHDL example for type pbit will be continued in subsequent sections:

TYPE pbit is bit
WITH VARIABLE count:integer:=0,
WITH SIGNAL changed:boolean;

Referencing of Implied Objects

In the preferred embodiment, implied objects are defined within a name space unique to each explicitly declared object having a subtype with one or more WITH clauses. This is the same name space used by user-defined attributes, leading to the potential for backward compatibility problems in cases where a subtype's WITH clause creates an implied object and an attribute specification creates an attribute of the same simple name (often such conflicts are significantly reduced using type-related overloading constraints). Implied objects may share the same reference mechanism as user-defined attributes:

For example, again using VHDL syntax:
VARIABLE b:pbit:='0'; —where pbit is defined above
. . .
pbit'count:=pbit'count+1;

Within the body of subprogram declarations, it is sometimes useful to refer to implied objects, either via explicit interface declarations or via function return values. Both interface declarations and return values behave as though passed by reference (not value). Thus the implied objects associated with a caller's actuals or return value assignment are identical to the implied objects seen internal to the subprogram body.

Implied objects scoped within a function's return value are brought into direct visibility within the body of a function, eliminating requirements for named return values (which are not present in many base languages).

For example, the logical AND function may be defined for the pbit example using the VHDL function:

```
FUNCTION "and" (l, r: pbit) RETURN pbit IS
BEGIN
    count := 2;
    -- count is an implied object associated with the return
    changed <= true;
    -- changed is an implied object associated with the return
    l'changed <= false;
    r'changed <= false;
    IF ((a = '1') and (b = '1')) THEN
        RETURN '1';
    ELSE
        RETURN '0';
    END IF;
END "and";
```

In general the full range of operators defined for a given type must be overloaded to handle implied objects appropriately. In addition, indexing, assignment and other capabilities must often be overloaded, even if the base language does not provide for their overloading. The next two sections will discuss these overloadings using VHDL as an example language.

Assignment Overloading

The behavior of signal and variable assignment operators or statements (depending on the base language) must generally be capable of being overloaded based on the base type being assigned and the kind of the target and value. In the preferred embodiment, illustrated here with VHDL, the overloaded signal assignment is executed after evaluating the value in the waveform element and before scheduling a waveform transaction (or resolution in VHDL). Capability to resolve overloading based on the actual's kind and the interface declaration kind requires augmentation of most programming and hardware description languages.

In the preferred embodiment, overloaded signal assignments may be represented as procedures taking either two or three parameters. The first parameter is the target of the signal assignment, which must be of kind SIGNAL mode OUT. The second parameter is the value being assigned. It must be of mode IN. The third, optional parameter is the delay, which must be of mode IN and type time. Overloaded variable assignments take two parameters. The first variable assignment parameter is the target of the variable assignment, which must be of kind VARIABLE, mode OUT. The second parameter is the value being assigned. It must be of mode IN.

In an overloaded signal assignment the value may be a literal (denoting the semantics associated with assigning a literal value to a signal), a signal (explicit or implicit) using a SIGNAL kind, a variable or an expression of VARIABLE kind.

To minimize the opportunity for inadvertent recursion, within the body of an overloaded assignment operator, further application of the same type's overloading are excluded during overload resolution. This has the side effect that the body of signal assignment statements may not include recursion. Variable assignments may still be overloaded within the body of a signal assignment overloading. Conversely the body of a variable assignment excludes further application of the same type's overloading during overload resolution however signal assignments may still be overloaded within the body of a variable assignment overloading.

Once assignments may be overloaded, it is useful to distinguish among more than one kind of assignment operation (where the associated body defines the appropriate assignment semantics). For example in VHDL, the assignment operators may use either the conventional "<=", ":=", "==" or a new, "<#" operator as in the signatures:

```
PROCEDURE "<=" (  SIGNAL t: OUT integer;
                  VARIABLE v: IN integer;
                  CONSTANT d: IN time);
PROCEDURE "<#" (  SIGNAL t: OUT integer;
                  VARIABLE v: IN integer;
                  CONSTANT d: IN time);
PROCEDURE ":=" (  VARIABLE t: OUT integer;
                  VARIABLE v: IN integer);
                  PROCEDURE "==" ( QUANTITY l: integer;
                  QUANTITY r: integer);
```

Those familiar with other assignment paradigms will recognize that additional assignment operators may be defined, perhaps even extended to allow new, technology-specific assignment operators.

Sub-Reference Overloading

Most HDL and programming languages provide for reference to zero or more components within an object of aggregate type. For example a program or design may refer to the first element of an array (called an indexed_name in VHDL) or elements two through five of an array (called a slice_name in VHDL). Such subreferences may appear on either the left (lval) or right (rval) of a statement. Such sub-references often must be overloaded to achieve the intended technology objectives. In the absence of overloading the normal sub-reference rules apply as defined by the base language.

Index and slice names on the left hand side of an assignment use a procedure for overloading. The first parameter is the prefix. The prefix is either a signal, variable or quantity (mixed signal current, voltage or other continuous object). Such a prefix must be of OUT mode and an array type. The left and right parameters (for a slice_name) or index (indexed_name) must be of the base type of the prefix's index. The value must be an IN mode with base type matching the element type of the prefix's array type. For example:

```
PROCEDURE "( )" (  SIGNAL    prefix:  OUT  bit_vector,
                   VARIABLE  left:    IN   integer,
                   VARIABLE  right:   IN   integer,
                   CONSTANT  value:   IN   bit);
```

-continued

| PROCEDURE "( )" ( | SIGNAL | prefix: | OUT | bit_vector, |
| | VARIABLE | index: | IN | integer, |
| | CONSTANT | value: | IN | bit); |

Index and slice names on the right hand side of an assignment use a function for overloading. The first parameter is the prefix. The prefix is a signal, constant, variable or quantity, which must be of IN mode for an array type. The left and right parameters (slice_name) or index (indexed_name) must be of the base type of the prefix's index. The return type must have a base type matching the element type of the prefix's array type. For example:

| FUNCTION "( )" ( | SIGNAL | prefix: | IN | bit_vector, |
| | VARIABLE | left: | IN | integer, |
| | VARIABLE | right: | IN | integer) |
| | RETURN bit; | | | |
| FUNCTION "( )" ( | SIGNAL | prefix: | IN | bit_vector, |
| | VARIABLE | index: | IN | integer) ) |
| | RETURN bit; | | | |

Other Operator Overloading

In order to full define a technology's semantics through a new type, generally all other operators which may be used in a design must be overloaded for the technology's type. For example, in VHDL, these can include:

| Logical operators: | AND, OR, NAND, NOR, XOR, XNOR |
| Reduction operators: | AND, OR, NAND, NOR, XOR, XNOR |
| Relational operators: | =, /=, <, <=, >, >= |
| Shift & rotate operators: | SLL, SRL, SLA, SRA, ROL, ROR |
| Dyadic adding operators: | +, −, & |
| Monadic sign operators: | +, − |
| Multiplying operators: | *, /, MOD, REM |
| Other operators: | **, ABS, NOT |

When an operator is referenced in a design but not overloaded either an error may be reported or the default behavior defined by the base language may be used.

Literal Overloading

Overloading assignment provides one means of describing how a technology should insert literals into a design. Following the augmented VHDL constructs in the preferred embodiment introduced earlier, a literal insertion may take the forms (note variation in the interface declaration kind):

| PROCEDURE "<=" ( | SIGNAL t: OUT integer; |
| | CONSTANT v: IN integer; |
| | CONSTANT d: IN time); |
| PROCEDURE "<#" ( | SIGNAL t: OUT integer; |
| | CONSTANT v: IN integer; |
| | CONSTANT d: IN time); |
| PROCEDURE ":=" ( | VARIABLE t: OUT integer; |
| | CONSTANT v: IN integer); |
| PROCEDURE "==" ( | QUANTITY l: integer; |
| | QUANTITY r: integer); |
| PROCEDURE "==" ( | CONSTANT l: integer; |
| | CONSTANT r: integer); |

Convergence

Postponed wait statements provide one mechanism for convergent iterating between entry/resume points and suspend points within a process, process-equivalent or thread. After resuming, if a process executes a sequential POSTPONED WAIT statement before executing a wait statement, the enclosing process, process-equivalent or thread is "marked". Subsequently, when reaching the next explicit or implied wait statement, the process immediately continues, without waiting, by executing beginning at the sequential statement at which it previously entered or resumed.

Using VHDL syntax, postponed wait statements have the syntax:

POSTPONED WAIT optional_on_clause;

where the optional_on_clause has the same form as the condition clause within a VHDL wait statement:

UNTIL boolean_expression

In the absence of an optional_on_clause, a default clause must be inferred using the form:

UNTIL true

For example:

```
P: PROCESS
BEGIN
    S1:  v := v + 1;
    S2:  WAIT FOR 2 ns;
    S3:  v := v + 1;
    S4:  POSTPONED WAIT UNTIL v < 4;
    S5:  v := v + 1;
    S6:  WAIT FOR 5 ns;
    S7:  v := 0;
    --implied loop directly to S1
END;
```

Would execute a trace of the form:

Initial resume (v initialized to 0 during elaboration of the process' declarative region)
S1 (v is 1 after execution)
S2 (process suspends until 2 ns)
S3 (v is 3 after execution)
S4 (postponed wait sets mark)
S5 (v is 4 after execution)
S6 (marking by previous postponed wait transfers control to S3 with no delay and clears mark)
S3 (v is 6 after execution)
S4 (condition fails, so process is not marked)
S5 (v is 7 after execution)
S6 (process suspends until 7 NS)
S7 (v is 0 after execution)
S1 (v is 1 after execution)
S2 (process suspends until 9 NS)

Postponed wait statements (sequential statements) are distinct from VHDL's postponed processes (concurrent statements). A postponed wait enables multiple iterations of one or more basic blocks within a process, process equivalent or thread. These iterations may occur on any delta cycle. In contrast a VHDL postponed process or process equivalent may only resume on the last of a sequence of delta cycles before time advances. Such concurrent postponed processes execute form the point at which they resume, until encountering the next wait statements (explicit or implied). When the wait statements' condition, sensitivity list and timeout enable the postponed process to resume, execution begins with the next sequential statement, not the sequential statement at which the process previously suspended.

When a wait has been postponed, the delta cycle remains unchanged (does not increment or reset to zero). The postponed function may be used to determine if the process, process-equivalent or thread is iterating as the result of a POSTPONED WAIT statement. The return value may then be used to selectively disable side effects, such as within variable or signal assignment. Availability of a conditional operator is useful but not essential in such application.

The postpone function is scoped within a predefined library. It may be visible by default or by selection. For example:

Library vhdlx;

Use vhdlx.standard.all;

Or more selectively as in the example:

Library vhdlx;

. . .

if (vhdlx.standard.postpone( )=true) then

. . .

Comparable use of other base languages and library organizations will be evident to those skilled in a such languages. In VHDL, postponed is defined to be a pure function, analogous to NOW in IEEE's latest VHDL dialects. This allows references within other, pure functions (important within overloaded operators).

Calls to the postponed function evaluate to true while executing statements as the result of a POSTPONED WAIT. During static elaboration and after resuming, until the first WAIT statement has been encountered (S6 in the example above), postpone evaluates to false. While iterating, after encountering the WAIT statement, postpone evaluates to TRUE. After passing the WAIT statement, postpone evaluates to FALSE again.

Persistence

Persistent state retains information even when "input" changes state. Common structures implementing persistent state include edge-trigger registers, level-sensitive latches, addressable register files, variables, static memory, dynamic (heap) memory and even sequential access storage (such as hard drive systems).

Disadvantages of the prior art are remedied by associating specific persistent state behavior with declared subtypes of a given logic system, as in the example package below (using the preferred embodiment in VHDL):

```
package logic is
    type elogic is ('0', '1', 'X');
    procedure reg1 (signal d: in elogic;
        signal q: out elogic;
        signal clk: in elogic;
        signal reset: in elogic;
        constant initial: in elogic);
    signal global_reset, clock: elogic;
    subtype reg_elogic is elogic register reg1 (clk => clock,
        reset => global_reset, initial => '1');
    function rising_edge(clk: elogic) return boolean;
end package logic;
```

The base type, elogic, denotes an enumerated type with three values (0, 1 and X). A subtype, declared as reg_elogic in this example, denotes a logic type with implied persistence specifically defined by the body of a registration subprogram, reg1, which is defined in an associated package body (below). The registration subprogram must include at least an input and an output. Additional parameters can be included to address the behavioral specification needs. This example illustrates a clock, reset and initial value.

```
package body logic is
    function rising_edge(clk: elogic) return boolean is
        begin
            -- Code omitted
        end;
    procedure reg1 (signal d: in elogic;
            signal q: out elogic;
            signal clk: in elogic;
            signal reset: in elogic;
            constant initial: in elogic) is
        variable state: elogic := '1';
    begin
        if (reset = '1') then
            state := initial;
        end if;
        if (rising_edge(clk)) then
            state := d;
        end if;
        q <= state;
    end procedure reg1;
end package body logic;
```

A design may then use the base type to declare objects without persistence and the subtype to declare objects with persistence specified by the body of reg1. Subtypes of logic may be declared with an inline register clause, such as signal s2 below. Whereas signal s0 utilizes values of parameters globally specified when subtype reg_logic was defined in package logic above, signal s2 can specify more localized actuals, such as the local clock, reset and initial value shown below. Finally new persistence functionality may be defined locally, as with procedure reg2 below and signal s2 which uses reg2.

```
use work.logic.all;
entity e is end entity e;
architecture a of e is
    signal local_reset: elogic;
    signal s0: elogic;
    signal s1: reg_elogic;
    signal s2: logic register reg1(clk => clock, reset =>
      local_reset, initial => '1');
        procedure reg2(signal d: in elogic;
            signal q: out elogic;
            signal clk: in elogic;
            signal reset: in elogic;
            constant initial: in elogic;
            signal added: in elogic) is
        begin
            -- Behavior not shown
        end;
    signal s4: logic register reg2
        (clk => clock,
         reset => local_reset,
         initial => '1',
         added => '0');
begin
    s0 <= '1';
    s1 <= s0;        -- s1 is registered
    s2 <= s0;        -- s2 is registered
end architecture a;
```

Commonly, signals are declared once and referenced multiple times. By specifying the registration functionality once, associating with a named or anonymous subtype and then declaring objects using the subtype once or many times, the design is both more compact and the design (such as in architecture a above) is textually and semantically separated from any specific technology (such as package logic above).

At the designer's discretion, persistence functionality may still be included within the design (as illustrated in architecture a of e above), so no flexibility is lost.

The latest programming and hardware description languages are adding powerful mechanisms for type generics or parameterization, such as ANSI C++ (templates), Accelera's SystemVerilog and IEEE's VHDL-200x effort. When combined with type generics or parameters, the innovative embodiment of persistence within subtypes taught above enables definition of structural components which can transparently be combined with many different kinds of persistence. For example, this allows definition of a Fourier transform class (C++ programming-oriented example) or a specialized arithmetic logic module or entity/architecture (hardware-oriented example), then creating instances of such classes, modules or other structural units using forms of persistence which were completely unknown when the original class or module was designed. These combinations are particularly powerful when automatically permuted by a tool capable of experimental permutation and analysis searching to optimize for specific goals, such as the one taught here.

Significant bodies of existing code use standards, such as IEEE's 1076.6 Standard for Register Transfer Level Synthesis mentioned above. In order to transform such existing code into a form suitable for exploration of various visible persistence subtypes, the design tool embodies a three step process. The first step follows rules for recognizing objects with persistent state, such as those embodied in IEEE Standard 1076. The second step identifies visible subtypes having a base type which is the same as or equivalent to the base type of the persistent state. The third step selects and assigns one or more such subtypes for the persistent state. If no such subtype is found, an error may be reported, the original construct used or a suitable subtype brought into visibility. If a unique subtype is found, that subtype is assigned to the object with persistent subtype. If more than one subtype is found, an error may be reported or the subtype yielding analysis with the best satisfaction of applicable goals may be assigned. As a further enhancement, if a suitable persistent subtype is not found, one may be automatically created to match semantics of the original explicit persistence.

```
package legacy_logic is
    type logic is ('0', '1', 'X');
    procedure reg1(signal d: in logic;
        signal q: out logic;
        signal clk: in logic;
        signal reset: in logic;
        constant initial: in logic);
    signal reset, clock: logic;
    subtype reg_logic is logic register reg1
        (reset => global_reset, initial => '0');
end package legacy_logic;
use work.logic.all;
entity e2 is end entity e2;
architecture a2 of e2 is
    signal q: logic; -- implicitly converted to reg_logic
    signal d: logic;
begin
    p: process (clock, global_reset)
    begin
        if (global_reset = '0') then
            q <= '0';
        end if;
        if (rising_edge(clock)) then
            q <= d;
        end if;
    end process;
end architecture a2;
```

Type and Structural Binding

Embodiment of the innovative step taught here augments a user-defined type or subtype by a map clause explicitly denoting another, previously defined type used to implement the type being declared during the synthesis of objects having the specified base type or a derived subtype. In the example below, an enumerated value may be implemented by a "one-hot" encoding (or by an implementation data type with parity, integrated integrity encoding or other characteristics).

```
TYPE logic IS    (    'U',    -- Uninitialized
                      'X',    -- Forcing Unknown
                      '0',    -- Forcing 0
                      '1',    -- Forcing 1
                      '-'     -- Don't care
                 ) MAP my_one_hot;
```

Implicit or explicit type conversion functions must be defined going from the declared type (my_logic in the example) to the implementation type (my_one_hot) in order to synthesize literals. Each of the operators defined and actually used in a design with the declared base type must be implicitly or explicitly defined in terms of either a behavioral subprogram (which can be in-lined with conventional hardware scheduling) or a structural implementation.

User-defined data types may be recursively mapped to other user-defined data types, however before synthesis can complete the recursion of operator subprograms must terminate in an operator subprogram that contains a map clause into a structural cell implementing the operator subprogram's functionality or parameters to a dynamic cell generator. For example, multiplication of two logic_vector types to yield another logic_vector might map into a specific logic_technology_library, entity multiplier, architecture pipelined as in the operator function below. The operator function may still include a conventional body used using pre-synthesis simulation.

FUNCTION "*" (L:logic_vector; R:logic_vector) RETURN logic_vector

MAP logic_technology_library.multiplier(pipelined);

The logic_technology_library must then include an entity such as the example below:

ENTITY multiplier is

PORT (l, r: in logic_vector, o: out logic_vector);

where the function operands are mapped to l and r of the entity and the return is mapped to the o port.

There must be at least one architecture in this example, called pipelined. More generally the architecture map be left out of the map clause, allowing the tool to choose among several architectures belonging to the multiplier entity based on analysis of the resulting properties relative to the set constraints and goals (optimization). The tool may choose based on pre-computed characterizations or each architecture (data-independent) or by substituting each architecture, running simulation, and comparing results against the active design constraints and goals.

Those familiar with hardware and software design will realize that the VHDL functions shown in the illustration above can readily be replaced with C++ operators or the equivalents in other design languages. In the same fashion, the VHDL entity used in the illustrate may readily be replaced by a Verilog module, user-defined primitive with predefined synthesis mapping or even mixed-signal/analog/RF/MW cell models to support full analog synthesis and optimization.

Specifying Multi-Purpose and General Purpose Processors

In the preferred embodiment taught here, a VHDL model of the target processor uses a canonical form to hierarchically designate:
  processor state,
  initialization,
  passivation,
  instruction decode
  transformations on processor state implemented by each instruction reachable from instruction decode All of these elements are located within a common library containing a package and one or more entity/architecture pairs or configurations thereof. The package contains types, subtypes, constants and attribute/attribute specifications used to describe the base architecture. Entity/architecture or configurations represent the instruction decode and other functional units within the processor.

In the preferred embodiment, the processor state is located within the above library's package, represented as a composite type (generally a record). The record includes all of the state used by the processor implementation (such as general purpose registers, floating point registers and special purpose registers). Subprograms within the same package provide for copying the state into a file, reading the state back from a file and interactively accessing the state.

An entity/architecture pair with fixed name represents the instruction fetch and decode. This entity/architecture pair also includes an object, perhaps of monitored (shared variable) or signal kind, used to store the processor's state. Internally the decode uses a multi-level case statement. This case statement decodes an instruction down to signals sent to other components representing functional units or calls to subprograms that implement instructions. The tool uses the case statement to model the instruction decode within the processor's simulation, to automatically generate an assembler/disassembler and to synthesize an optimized instruction pre-fetch and dispatch unit.

Other entity/architecture pairs, instantiated as components within the instruction decode (above) represent functional units employed by the processor. Common examples include integer units, floating point units, and units which maintain the program counter. The units need not be explicitly pipelined. Compiler transformations can infer various levels of pipelining and concurrency based on compile-time data-flow analysis, allowing synthesis of many different processors based on actual usage, objectives and available resources.

Use of a consistent naming convention facilitates tool use of the processor model and reduces the software engineering cost (initial and life-cycle). At significantly greater complexity, units can be identified by the tool (consistent naming is a convenience rather than a requirement to practice this invention).

The processor model may use all of the language augmentation mechanisms previously taught, facilitating the automatic generation of optimized forms using a variety of accessible type systems denoting logic or physical technologies. For example, the types initially used in the human generated processor model may be transformed manually or automatically by the tool so as to use a variety of asynchronous, fault tolerant or physical technologies required to optimally satisfy the design's objectives.

Tool Operating Modes Using Language Augmentation

Drawing 2 illustrates the graphical user interface. The user interface consists of four collections of functionality, DesignViews (15), ModelViews (16), ImplementationViews (17) and PhysicalViews (18). DesignViews provides the graphical manifestation of 3, 4 and 5. ModelViews provides the graphical manifestation of 6. ImplemetationViews provides the graphical manifestation of 7 and 8. Physical Views provides the graphical manifestation of 9. Each of the four collections may have multiple instances. Tabs provide for actions and examination of distinct views such as the technology binding, simulation, power analysis, reliability analysis and other characteristics.

Model Verification & Optimization Operating Mode

In Drawing 5, based on the technologies specified in the database (5), ModelView presents a menu of available technologies (generally mapped one to one with library units in the database resulting from analysis of technology specifications). Consistently in this and subsequent views, the color of blocks (40), statements and objects (41) denotes the technologies to which the block, statement and objects are bound for behavioral analysis. The compiler initially assigns technology bindings so as to gradually optimize the objectives specified in the design specification (1) through transformations in the interpretation of types visible in each elaborated instance of the block, statement or object. Conventional type conversion functions provide for interfaces between distinct types (such as converting parity logic to non-parity logic. The user may over-ride the automatic bindings by dragging and dropping technologies (actually type systems) from the palette (42) to the blocks (40), statements or objects (41) so as to force specific bindings based on designer bias or results from model view analysis. More detailed pop-ups containing localized results of analysis are available via a right click pull-down menu, allowing for presentation of tab-specific analysis results beyond the immediate values shown in the value pane 41.

In Drawing 6, right click menus associated with each object in the graphical interface provide analytic visibility into other aspects of the design, such an interactive debugger view into a process, process equivalent or thread. The debugger provides for more detailed visibility and interaction (such as time, value or statement breakpoints).

Blocks, statements (concurrent, sequential and simultaneous) may be selected via the hierarchical block pane (52), the object pane (53), containing objects in the block selected by 52 or a source code pane displaying source code for the elaborated block shown in pane 54 (within the Design View). For programming languages, blocks may take the form of subprogram calls, template instances or sequential control such as a loop.

Embedded Executable Partitioning and Compilation Mode

In Drawing 3, specification for a processor begins with a behavioral, HDL representation of the processor architecture (20). The HDL is analyzed (21) using (3) into an intermediate representation (22) contained in 4 or 5. A code generator (23) uses the model to create an intermediate representation (generally in a programming language) representing the compiler backend specific to the processor described in the HDL model. This backend must be compiled and linked (statically or dynamically) with the remainder of the design tool, yielding a complete design tool with the capability to generate code for the input processor specification.

In Drawing 4, details of 23, shown as 30, extract the processor's intermediate representation (22) into a processor state such as the architected processor registers (31), the instruction decode (32) and the instruction execution (33). In the Code Generator and Optimizer (24), the processor state (31) is converted into types used by the resulting code generator, enumerations of the processor's state (such as an enumeration for each register) and appropriate type conversions (such as from a full integer to a limited range integer used in an instruction's immediate field). The instruction decode segment of the processor specification converts in an inline assembler (35) and disassembler by reversing the sense of nested case statements. The entity/architecture or subprograms defining algorithmically how to execute each instruction or instruction family (33) convert into operator templates and optimizations specific to particular processors using well-known template-based code generation algorithms and other context-specific code generation optimizations.

Logic Partitioning, Synthesis & Optimization Mode

In Drawing 8, multivariate algorithms for incrementally solving constraints, such as are presented by the combination of evaluated attribute values, design objectives and actions via the graphical user interfaces (15, 16, 17 and 18) are well known to the designers of large scale analog simulators and are employed by the current invention with little or no change. For simplicity, since the preferred embodiment includes an analog simulation capability it is most practical to use the same constraint engine as is used to solve systems of constraint equations within an analog simulation block (and thus enjoy the same optimization efforts already invested). However a multitude of approaches are known in the analog simulation and production machine literature for the solution of such constraint systems.

Often the combined set of constraints can only be satisfied within a tolerance (not identically). This is a well known problem in analog simulation or production machines. To graphically depict the difference between objective and analysis result values, each icon is capable of split colors (such as 53). Both colors are drawn from the current tab's palette. One portion of the icon color represents the tab-specific objective, the other part of the icon represents the current result of analysis. This may be generalized to icons with more than two color bands. As objective and measured values converge using the internal (analog) solver, the icon will assume a continuous color. Icons associated with a block are banded to show the disparity of values associated with all blocks, statements and objects contained within the block (summary of disparity between objective and actual analysis). Exactly the same mechanism may serve within analog simulation to help explain a failure of the analog solver to converge.

In Drawing 9, within the implementation view, another technology tab allows both observing and manually binding (constraining) blocks, statements and objects to particular physical technologies, again denoted by available (visible) types in the database, shown graphically on the physical technology palette (59). Analogous to the operation of binding in Drawing 5 of logical technology, physical technologies may be automatically selected based on evaluation of attribute values against objectives specified as (HDL) attributes within the design.

In Drawing 10, analogous to the analysis of property-specific tabs in ModelView, the color of blocks, statements and icons in each of the analytic views of ImplementationView denotes the objective and analyzed constraints (such as the reliability view shown in Drawing 10). The primary difference between tabs in ModelViews and ImplementationViews is the additional incorporation of attribute values associated with specific physical technology bindings (type bindings internally).

Post-Synthesis Verification Mode

In Drawing 11, tabs within PhysicalViews operate analogously to tabs in ModelViews and ImplementationViews except that the analysis takes into account physical design information such as actual estimated point-to-point transmission delay, power after physical design is taken into account (such as driver or transistor sizing), parasitic and radiated noise and comparable properties. Techniques for deriving such information directly or via intermediate files are well known (such as trace files, standard delay format files, .lef, .def and .lib files).

What is claimed is:

1. A method for representing a design comprising: a processor, for
    a code generator within a computer generating a processor specification that specifies the design for the processor, wherein the processor specification is comprised of a plurality of augmented types, a plurality of states and plurality of operators causing state transformations;
    the code generator and an optimizer coupled to the computer translating the processor specification into a compiler module of a compiler, thereby resolving a hierarchy of one or more of the plurality of augmented types in terms of terminal structural elements of the processor, and transforming a target-independent code generator into a target-dependent program implementation; and
    the compiler and a linker coupled to the computer transforming the processor specification into an executable simulation of the processor, wherein the simulation predicts a result of executing the program implementation on a physical embodiment of the terminal structural elements.

2. The method from claim 1, further comprising:
    synthesizing the processor specification into a realizable device for enabling execution of programs compiled for the terminal structural elements.

3. The method from claim 1, further comprising:
    generating a plurality of executable tests from the processor specification; and
    testing compliance of an embodiment of the processor as a realizable device to the processor specification using the plurality of executable tests.

* * * * *